(12) United States Patent
Sakuyama et al.

(10) Patent No.: US 7,505,630 B2
(45) Date of Patent: Mar. 17, 2009

(54) IMAGE PROCESSING APPARATUS, IMAGE PROCESSING METHOD, PROGRAM, AND RECORDING MEDIUM THAT ALLOW SETTING OF MOST APPROPRIATE POST-QUANTIZATION CONDITION

(75) Inventors: Hiroyuki Sakuyama, Tokyo (JP); Takao Inoue, Kanagawa (JP); Shin Aoki, Kanagawa (JP); Keiichi Ikebe, Kanagawa (JP); Taku Kodama, Kanagawa (JP); Takeshi Koyama, Tokyo (JP); Ikuko Yamashiro, Kanagawa (JP); Takashi Maki, Kanagawa (JP); Akira Takahashi, Kanagawa (JP); Takanori Yano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 944 days.

(21) Appl. No.: 10/706,598

(22) Filed: Nov. 11, 2003

(65) Prior Publication Data
US 2004/0131264 A1 Jul. 8, 2004

(30) Foreign Application Priority Data
Nov. 11, 2002 (JP) ............................ 2002-326368

(51) Int. Cl.
*G06K 9/36* (2006.01)
*G06K 9/46* (2006.01)
(52) U.S. Cl. ........................ 382/233; 382/232; 382/240; 382/250; 382/251
(58) Field of Classification Search ................ 382/232, 382/233, 248, 240, 250, 251, 274, 270; 348/405; 375/240.03, 240.22, 240.243, 240.245
See application file for complete search history.

(56) References Cited

U.S. PATENT DOCUMENTS

| 6,259,741 | B1 * | 7/2001 | Chen et al. ............. 375/240.26 |
| 6,587,508 | B1 * | 7/2003 | Hanamura et al. ..... 375/240.24 |
| 7,139,428 | B2 * | 11/2006 | Kobayashi et al. .......... 382/180 |
| 7,170,938 | B1 * | 1/2007 | Cote et al. ............. 375/240.03 |
| 2002/0154823 | A1 * | 10/2002 | Okada ........................ 382/233 |
| 2002/0196851 | A1 * | 12/2002 | Lecoutre ................ 375/240.12 |
| 2003/0002581 | A1 * | 1/2003 | Moni et al. ............ 375/240.03 |
| 2005/0008341 | A1 * | 1/2005 | Yada et al. ................... 386/113 |
| 2006/0088098 | A1 * | 4/2006 | Vehvilainen ........... 375/240.03 |

FOREIGN PATENT DOCUMENTS

| JP | 05-219332 | 8/1993 |
| JP | 07-115545 | 5/1995 |
| JP | 08-339452 | 12/1996 |
| JP | 11-122573 | 4/1999 |
| JP | 2001-069508 | 3/2001 |
| JP | 2001-320588 | 11/2001 |
| JP | 2002-281382 | 9/2002 |

OTHER PUBLICATIONS

Japanese Office Action for Appln. No. JP2002-326368, issued Nov. 8, 2006, mailed Nov. 20, 2006 (2 pages).
Nomizu, Yasuyuki, "Next-Generation Image Coding Method JPEG 2000," Triceps, Feb. 13, 2001.

\* cited by examiner

*Primary Examiner*—Matthew C Bella
*Assistant Examiner*—Ali Bayat
(74) *Attorney, Agent, or Firm*—Blakely, Sokoloff, Taylor & Zafman LLP

(57) ABSTRACT

An image processing apparatus includes a condition setting unit with which a user sets a post-quantization condition. A partial decoding and decompression unit partially decodes and decompresses coded data according to the post-quantization condition set by the user, thereby reproducing image data the same as that reproduced by decoding and decompressing coded data after post-quantization processing in accordance with the post-quantization condition. An image data displaying unit displays on a display unit the image data reproduced by the partial decoding and decompression unit.

30 Claims, 24 Drawing Sheets

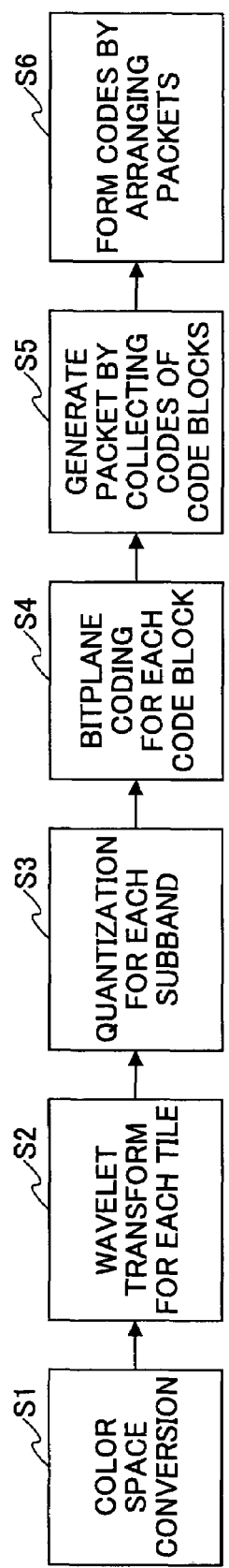

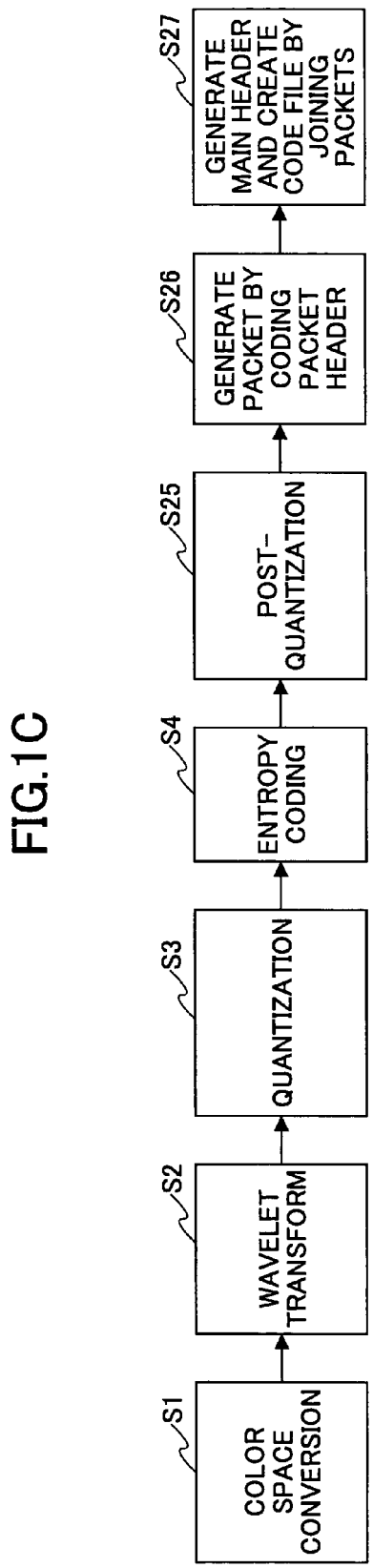

DECOMPOSITION LEVEL 0

DECOMPOSITION LEVEL 1

DECOMPOSITION LEVEL 2

DECOMPOSITION LEVEL 3

FIG.6

| | | NAME | CODE | MAIN HEADER | TILE-PART HEADER |
|---|---|---|---|---|---|
| DELIMITING MARKER SEGMENTS | START OF CODESTREAM<br>START OF TILE-PART<br>START OF DATA<br>END OF CODESTREAM | SOC<br>SOT<br>SOD<br>EOC | 0xff4f<br>0xff90<br>0xff93<br>0xffd9 | ESSENTIAL<br>IMPOSSIBLE<br>IMPOSSIBLE<br>IMPOSSIBLE | IMPOSSIBLE<br>ESSENTIAL<br>LAST MARKER<br>IMPOSSIBLE |
| FIXED INFORMATION MARKER SEGMENTS | IMAGE AND TILE SIZE | SIZ | 0xff51 | ESSENTIAL | IMPOSSIBLE |
| FUNCTIONAL MARKER SEGMENTS | CODING STYLE DEFAULT<br>CODING STYLE COMPONENT<br>REGION-OF INTEREST<br>QUANTIZATION DEFAULT<br>QUANTIZATION COMPONENT<br>PROGRESSION ORDER CHANGE | COD<br>COC<br>RGN<br>QCD<br>QCC<br>POC | 0xff52<br>0xff53<br>0xff5e<br>0xff5c<br>0xff5d<br>0xff5f | ESSENTIAL<br>OPTION<br>OPTION<br>ESSENTIAL<br>OPTION<br>OPTION(*1) | OPTION<br>OPTION<br>OPTION<br>OPTION<br>OPTION<br>OPTION(*1) |
| POINTER MARKER SEGMENTS | TILE-PART LENGTH, MAIN HEADER<br>PACKET LENGTH, MAIN HEADER<br>PACKET LENGTH, TILE-PART HEADER<br>PACKED PACKET HEADERS, MAIN HEADER<br>PACKED PACKET HEADERS, TILE-PART HEADER | TLM<br>PLM<br>PLT<br>PPM<br>PPT | 0xff55<br>0xff57<br>0xff58<br>0xff60<br>0xff61 | OPTION<br>OPTION<br>IMPOSSIBLE<br>OPTION(*2)<br>IMPOSSIBLE | IMPOSSIBLE<br>IMPOSSIBLE<br>OPTION<br>IMPOSSIBLE<br>OPTION(*2) |
| IN BIT STREAM MARKER SEGMENTS | START OF PACKET<br>END OF PACKET HEADER | SOP<br>EPH | 0xff91<br>0xff92 | IMPOSSIBLE<br>IMPOSSIBLE | OPTION<br>OPTION |
| INFORMATION MARKER SEGMENTS | COMPONENT REGISTRATION<br>COMMENT | CRG<br>COM | 0xff63<br>0xff64 | OPTION<br>OPTION | OPTION<br>OPTION |

| SOT | Lsot | Isot | Psot | TPsot | TNsot |

| SUBBAND | 2LL | | | | 2HL | | | | 2LH | | | | 2HH | | | | 1HL | | | | | | | | | | | 1LH | | | | | | | | | | | 1HH | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| CODE BLOCK NO. | 0 | 1 | 2 | 3 | 0 | 1 | 2 | 3 | 4 | 5 | 6 | 7 | 8 | 9 | 10 | 11 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
| BINARY NUMBER OF COEFFICIENT MSB | | | | | | | | | | | | | | | | | | | | | | | | | | | | | | | | | | | | | | | | | | | |
| CODE OF 12TH BIT | | 128 | | | | | 147 | | | | 147 | | | | 169 | | | | | 203 | | | | | | | | | 203 | | | | | | | | | 244 | | | | | |
| CODE OF 11TH BIT | | 141 | | | | | 162 | | | | 162 | | | | 186 | | | | | 223 | | | | | | | | | 223 | | | | | | | | | 268 | | | | | |
| CODE OF 10TH BIT | | 155 | | | | | 178 | | | | 178 | | | | 205 | | | | | 246 | | | | | | | | | 246 | | | | | | | | | 295 | | | | | |
| CODE OF 9TH BIT | | 170 | | | | | 196 | | | | 196 | | | | 225 | | | | | 270 | | | | | | | | | 270 | | | | | | | | | 324 | | | | | |
| CODE OF 8TH BIT | | 187 | | | | | 216 | | | | 216 | | | | 248 | | | | | 297 | | | | | | | | | 297 | | | | | | | | | 357 | | | | | |
| CODE OF 7TH BIT | | 206 | | | | | 237 | | | | 237 | | | | 273 | | | | | 327 | | | | | | | | | 327 | | | | | | | | | 393 | | | | | |
| CODE OF 6TH BIT | | 227 | | | | | 261 | | | | 261 | | | | 300 | | | | | 360 | | | | | | | | | 360 | | | | | | | | | 432 | | | | | |
| CODE OF 5TH BIT | | 249 | | | | | 287 | | | | 287 | | | | 330 | | | | | 396 | | | | | | | | | 396 | | | | | | | | | 475 | | | | | |
| CODE OF 4TH BIT | | 274 | | | | | 316 | | | | 316 | | | | 363 | | | | | 435 | | | | | | | | | 435 | | | | | | | | | 523 | | | | | |
| CODE OF 3RD BIT | | 302 | | | | | 347 | | | | 347 | | | | 399 | | | | | 479 | | | | | | | | | 479 | | | | | | | | | 575 | | | | | |
| CODE OF 2ND BIT | | 332 | | | | | 382 | | | | 382 | | | | 439 | | | | | 527 | | | | | | | | | 527 | | | | | | | | | 632 | | | | | |
| CODE OF 1ST BIT | | 365 | | | | | 420 | | | | 420 | | | | 483 | | | | | 580 | | | | | | | | | 580 | | | | | | | | | 695 | | | | | |
| LSB | | | | | | | | | | | | | | | | | | | | | | | | | | | | | | | | | | | | | | | | | | | |

AMOUNT OF CODES AFTER ENTROPY CODING BY BIT PLANES FOR EACH SUBBAND

TOTAL AMOUNT OF CODES : 26553BYTES

REFERENCE AMOUNT OF CODES FOR 1 LAYER : 2655BYTES

FIG.17

| SUBBAND | 2LL | | | | 2HL | | | | 2LH | | | | 2HH | | | | 1HL | | | | | | | | 1LH | | | | | | | | 1HH | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|
| CODE BLOCK NO. | 0 | 1 | 2 | 3 | 0 | 1 | 2 | 3 | 4 | 5 | 6 | 7 | 8 | 9 | 10 | 11 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
| BINARY NUMBER OF COEFFICIENT | | | | | | | | | | | | | | | | | | | | | | | | | | | | | | | | | | | | | | | | | | | |
| CODE OF 12TH BIT (MSB) | 0 | | | | 4 | | | | | 5 | | | | | 20 | | | | | 33 | | | | | | | | | 34 | | | | | | | | | 53 | | | | |
| CODE OF 11TH BIT | 1 | | | | 8 | | | | | 9 | | | | | 25 | | | | | 43 | | | | | | | | | 44 | | | | | | | | | 60 | | | | |
| CODE OF 10TH BIT | 2 | | | | 12 | | | | | 13 | | | | | 30 | | | | | 47 | | | | | | | | | 48 | | | | | | | | | 54 | | | | |
| CODE OF 9TH BIT | 3 | | | | 16 | | | | | 17 | | | | | 37 | | | | | 51 | | | | | | | | | 52 | | | | | | | | | 57 | | | | |
| CODE OF 8TH BIT | 6 | | | | 21 | | | | | 22 | | | | | 42 | | | | | 55 | | | | | | | | | 56 | | | | | | | | | 70 | | | | |
| CODE OF 7TH BIT | 7 | | | | 23 | | | | | 24 | | | | | 45 | | | | | 58 | | | | | | | | | 59 | | | | | | | | | 73 | | | | |
| CODE OF 6TH BIT | 10 | | | | 26 | | | | | 27 | | | | | 46 | | | | | 62 | | | | | | | | | 63 | | | | | | | | | 76 | | | | |
| CODE OF 5TH BIT | 11 | | | | 28 | | | | | 29 | | | | | 49 | | | | | 65 | | | | | | | | | 66 | | | | | | | | | 79 | | | | |
| CODE OF 4TH BIT | 14 | | | | 31 | | | | | 32 | | | | | 50 | | | | | 68 | | | | | | | | | 69 | | | | | | | | | 80 | | | | |
| CODE OF 3RD BIT | 15 | | | | 35 | | | | | 36 | | | | | 54 | | | | | 71 | | | | | | | | | 72 | | | | | | | | | 81 | | | | |
| CODE OF 2ND BIT | 18 | | | | 38 | | | | | 39 | | | | | 57 | | | | | 74 | | | | | | | | | 75 | | | | | | | | | 82 | | | | |
| CODE OF 1ST BIT (LSB) | 19 | | | | 40 | | | | | 41 | | | | | 61 | | | | | 77 | | | | | | | | | 78 | | | | | | | | | 83 | | | | |

HIERARCHY OF CODES BY BITPLANES FOR EACH SUBBAND

FIG.19

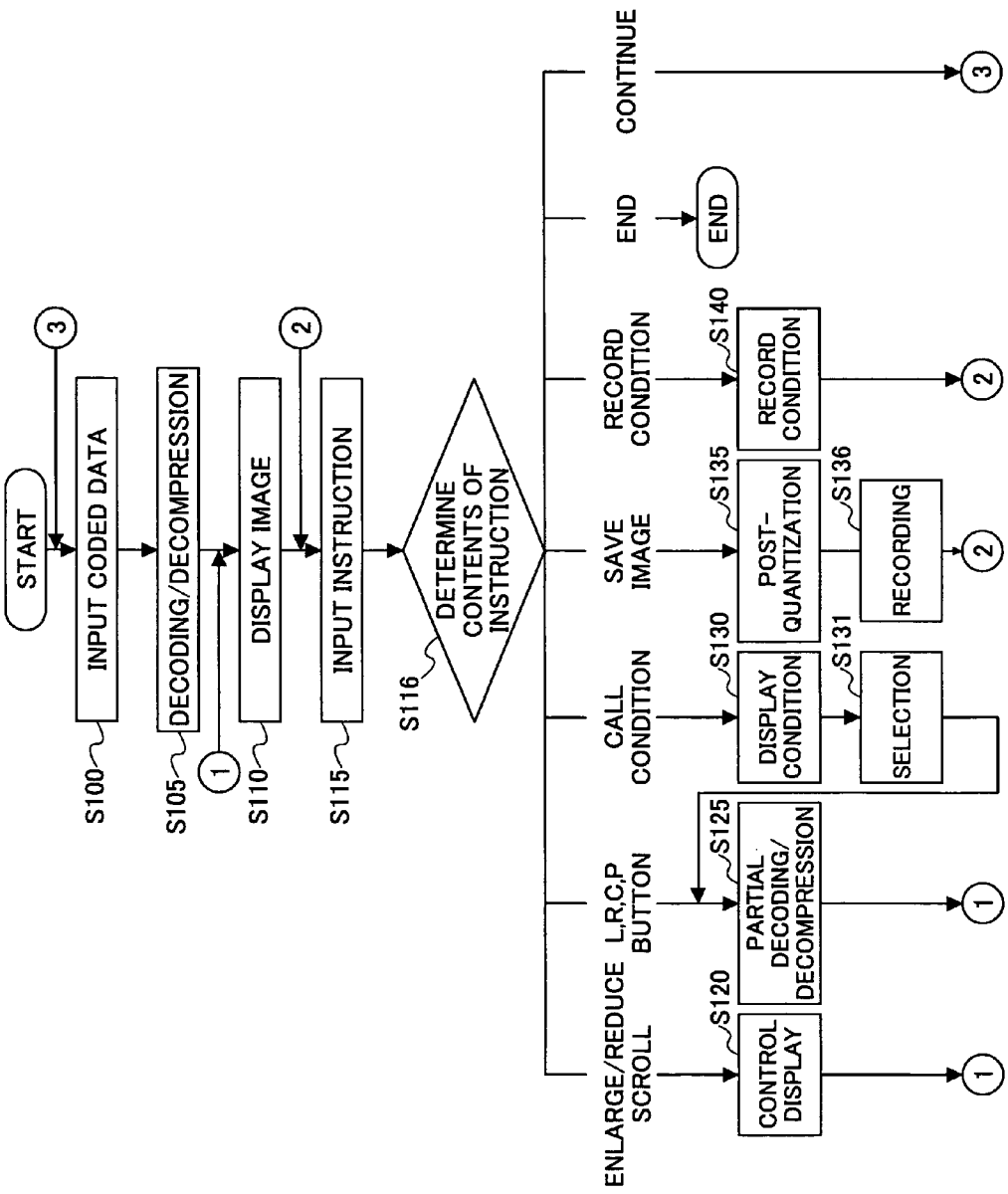

FIG.23A
| 0 | 1 | 2 | 3 | 4 |
|---|---|---|---|---|
| 5 | 6 | 7 | 8 | 9 |
| 10 | 11 | 12 | 13 | 14 |
| 15 | 16 | 17 | 18 | 19 |
| 20 | 21 | 22 | 23 | 24 |
FIG.23B
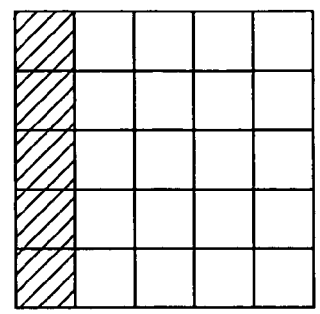
FIG.23C
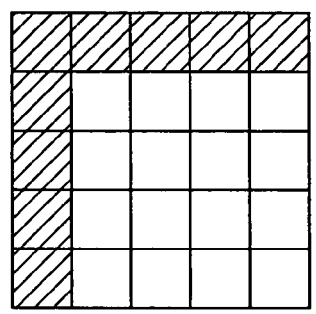
FIG.23D
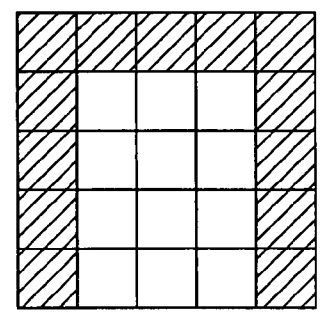
FIG.23E
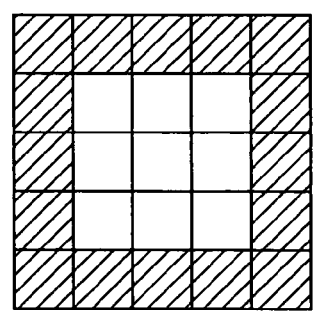

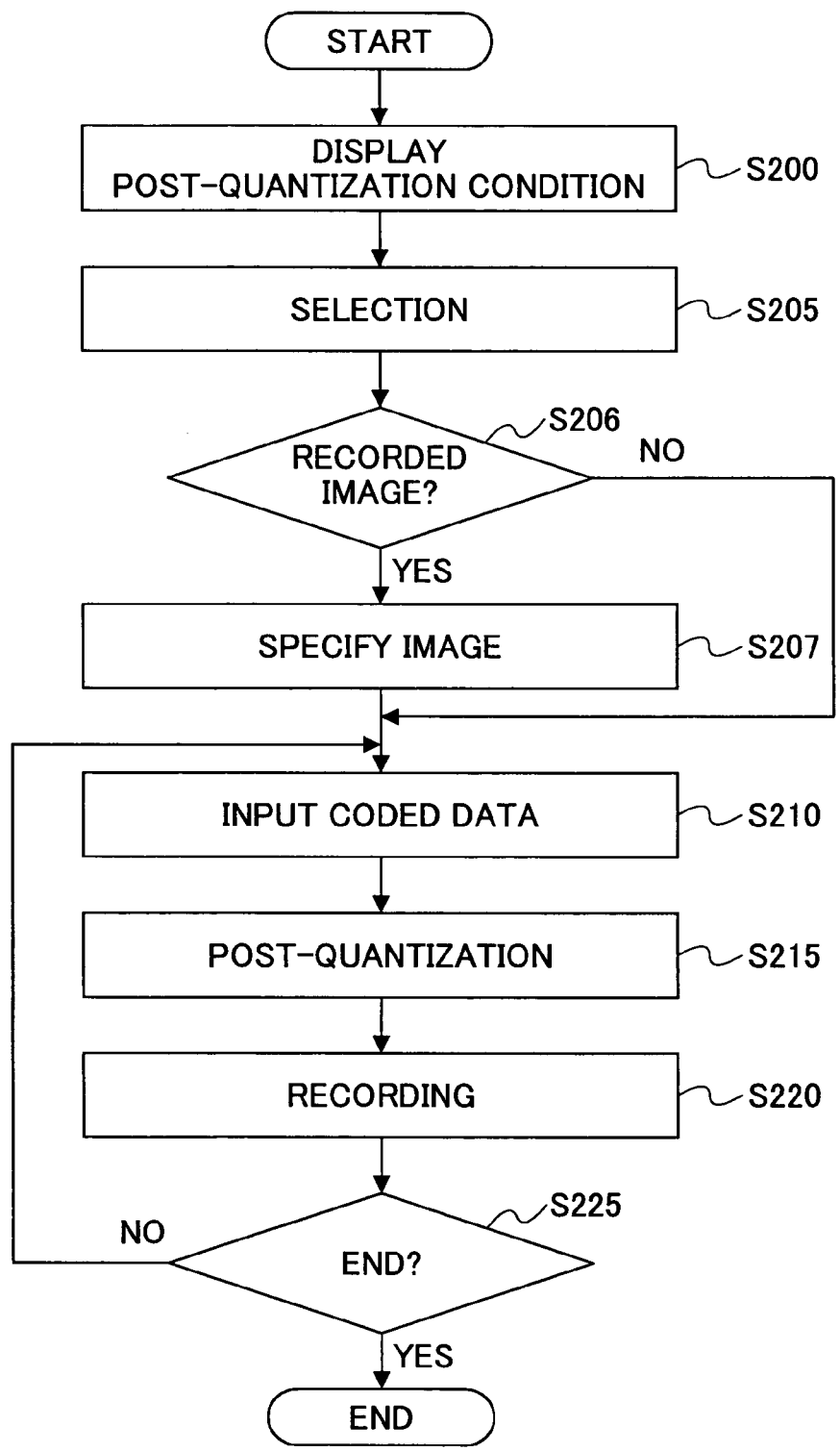

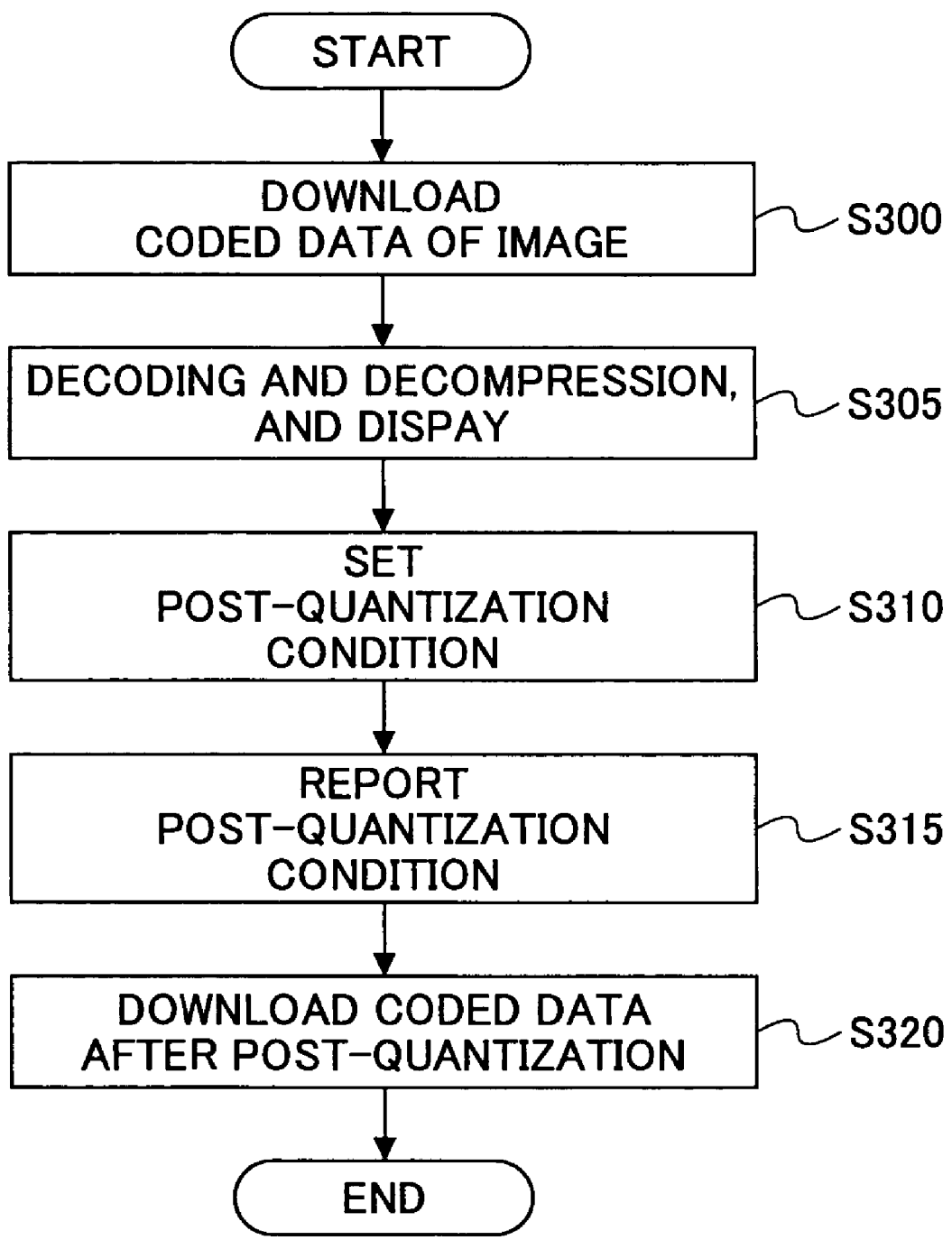

IMAGE PROCESSING APPARATUS, IMAGE PROCESSING METHOD, PROGRAM, AND RECORDING MEDIUM THAT ALLOW SETTING OF MOST APPROPRIATE POST-QUANTIZATION CONDITION

CLAIM OF PRIORITY

The present application claims priority to the corresponding Japanese Application No. 2002-326268, filed on Nov. 11, 2002, the entire contents of which are hereby incorporated by reference.

BACKGROUND OF THE INVENTION

1. Field of the Invention

The present invention generally relates to digital cameras and other image processing apparatuses, and more particularly, to an image processing apparatus that processes coded data allowing post-quantization such as JPEG 2000 coded data.

2. Description of the Related Art

Generally, in image forming apparatuses, image data are subjected to compression coding prior to recording or transmission of the image data.

Taking an electronic camera device, such as a digital camera, as an example of such image forming apparatuses, in order to improve use efficiency of a recording medium for recording an image, data of a photographed still image or moving image are subjected to compression coding and thereafter recorded on the recording medium. Generally, regarding the compression coding method, JPEG is used for compression coding of a still image and MPEG is used for compression coding of a moving image.

In the compression coding methods such as JPEG, when it is desired to reduce the data amount (to increase the compression rate) of coded data of an image that are already recorded on a recording medium, it is necessary to decode and decompress the coded data and to perform compression coding again on the reproduced image data by varying a quantization parameter or the like. On this occasion, undesirable image degradation occurs. In order to avoid such image degradation caused by recompression (hereinafter referred to as "generation image degradation"), in digital cameras, for example, generally, the compression rate is designated before photographing. Commonly, the compression rate is designated by selecting an image quality mode (high quality, normal, economy, etc.).

However, freedom of choice of a user is significantly limited when compression rates are limited to those corresponding to several image quality modes as mentioned above, though arbitrary compression rates can be achieved in accordance with the degree of quantization in variable length coding methods such as JPEG. For example, even if the compression rate is excessively low in a high image quality mode and the degree of image degradation in a normal mode is not acceptable, a user has no other choice but to select one of the modes. Further, the user has to select the image quality mode in advance of photographing so as to avoid the above-mentioned generation image degradation.

Japanese Laid-Open Patent Application No. 8-339452 discloses an apparatus and a method that do not set a compression rate (that is, a parameter for compression coding) by selecting an image quality mode, but directly set the parameter for compression coding according to JPEG. In the apparatus and the method described in the above-mentioned application, resolution of an image is converted in accordance with a plurality of resolution parameters, images after the resolution conversion are displayed, and a resolution parameter is set when a user selects one of the displayed images. A sub-sampling parameter and a quantization table parameter are also set by the user in similar procedures. Then, compression coding according to JPEG is performed by using all of the parameters that are set, and the coded data are decoded, decompressed and displayed (the corresponding image is displayed). The user confirms acceptability of the setting of each parameter based on the displayed image.

With such apparatus and method, the user can arbitrarily set the parameters for compression coding (accordingly, the compression rate). When JPEG is assumed, however, a working memory having a large capacity is required, which stores original image data or original DCT coefficients at the time of parameter setting.

JPEG 2000 (ISO/IEC FCD 15444-1) and Motion-JPEG 2000 (ISO/IEC FCD 15444-3) are attracting attention as compression coding methods that take the place of JPEG and MPEG (for example, refer to "Next-Generation Image Coding Method JPEG 2000," Yasuyuki Nomizu, Triceps, Feb. 13, 2001). Motion-JPEG 2000 handles a moving image by assuming each of a plurality of consecutive still images as a frame. In terms of each frame, Motion-JPEG 2000 conforms to JPEG 2000. JPEG 2000 possesses a lot of features. One of the features is that JPEG 2000 allows adjustment of data amount or a compression rate while coded data remain coded by discarding codes of the coded data (post-quantization processing). When the data amount is reduced and the compression rate is increased by post-quantization processing, image degradation due to the increase of the compression rate occurs. However, undesired generation image degradation does not occur, unlike when decoding and decompression is performed and then compression coding is performed again.

Japanese Laid-Open Patent Application No. 2001-320588 discloses a memory management method and an apparatus that provide a free (unused) area of an image memory by performing post-quantization processing on JPEG 2000 coded data by layers, resolution levels, or components. In post-quantization processing, a large capacity working memory is not required since original image data are not used.

As can be appreciated by the foregoing description, in digital cameras and other image forming apparatuses that handle coded data of images, it is desirable for the user to be able to arbitrarily adjust the data amount or the compression rate of coded data. In addition, at the time of adjustment, it is desirable for the user to be able to confirm the degree of image degradation in advance. Also, it is desirable for generation image degradation not to occur due to such adjustment. Further, in digital cameras, for example, at an arbitrary moment before and after photographing, it is desirable to be able to adjust the amount of coded data or the compression rate. Additionally, it is desirable that a large capacity working memory not be required for a process for such adjustment.

SUMMARY OF THE INVENTION

An image processing apparatus, image processing method, program, and recording medium that allow setting of most appropriate post-quantization condition are described. In one embodiment, an image processing apparatus comprises a display unit, a condition setting unit by which a user sets a post-quantization condition, a partial decoding and decompression unit that partially decodes and decompresses coded data in accordance with the post-quantization condition set by the user using the condition setting unit, thereby reproducing image data the same as image data reproduced by decoding and decompressing the coded data after post-quantization processing in accordance with the post-quantization condition, and an image data displaying unit that displays on the display unit the image data reproduced by the partial decoding and decompression unit.

BRIEF DESCRIPTION OF THE DRAWINGS

FIGS. 1A, 1B and 1C are block diagrams for illustrating the algorithms of JPEG 2000;

FIG. 6 is a list of markers and marker segments;

FIG. 7 is a schematic diagram showing the structure of an SOT marker segment;

FIG. 16 is a schematic diagram showing results of entropy coding by bit planes for each subband;

FIG. 17 is a schematic diagram showing ranking of a hierarchy of codes by bit planes for each subband;

FIG. 19 is a schematic diagram showing the relationship between layers and packets;

FIG. 21 is a flow chart for illustrating an operation mode A in an embodiment;

FIGS. 23A, 23B, 23C, 23D and 23E are schematic diagrams for illustrating setting of a post-quantization condition relating to the number of tiles;

FIG. 24 is a flow chart for illustrating an operation mode B in an embodiment;

FIG. 26 is a flow chart for illustrating the operation in an embodiment.

DETAILED DESCRIPTION OF THE PREFERRED EMBODIMENTS

Figure 1B:
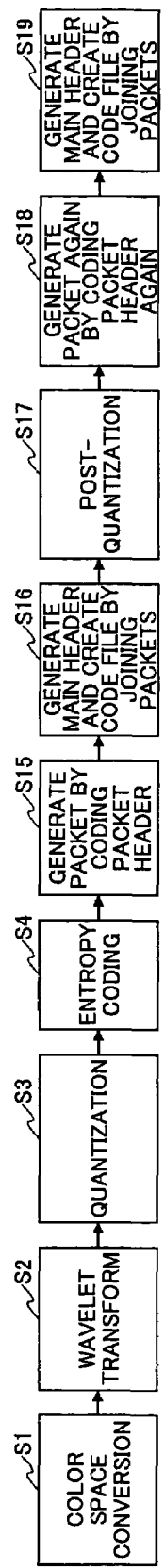

One or more embodiments of the present invention provide an improved and useful image forming apparatus, image processing method, program, or recording medium in which one or more of the above-mentioned problems are eliminated.

One or more of the present invention allow a user to easily set a most appropriate post-quantization condition in a digital camera and other image forming apparatuses using compression coding methods that allow post-quantization such as JPEG 2000.

One or more embodiments of the present invention achieve post-quantization of coded data in accordance with a post-quantization condition that is set.

Coded data allowing post-quantization, such as JPEG 2000 coded data, naturally allow partial decoding and decompression. Paying attention to the fact that such partial decoding and decompression are allowed, one or more embodiments of the present invention aim at allowing a user to arbitrarily set a post-quantization condition as confirming the degree of image degradation due to post-quantization and that post-quantization of coded data can be performed under the set condition.

In order to achieve the above-mentioned objects, according to one embodiment of the present invention, an image processing apparatus includes:

a display unit;

a condition setting unit by which a user sets a post-quantization condition;

a partial decoding and decompression unit that partially decodes and decompresses coded data in accordance with the post-quantization condition set by the user using the condition setting unit, thereby reproducing image data the same as image data reproduced by decoding and decompressing the coded data after post-quantization processing in accordance with the post-quantization condition; and an image data displaying unit that displays on the display unit the image data reproduced by the partial decoding and decompression unit.

Additionally, according to another embodiment of the present invention, there is provided an image processing method that includes:

setting a post-quantization condition by a user;

partially decoding and decompressing coded data in accordance with the post-quantization condition set by the user, thereby reproducing image data the same as image data reproduced by decoding and decompressing the coded data after post-quantization processing in accordance with the post-quantization condition; and displaying the image data reproduced in partially decoding and decompressing coded data.

In addition, according to another embodiment of the present invention, there is provided a program for causing a computer to perform an imaging process, the program including the instructions that:

cause the computer to prompt a user to set a post-quantization condition;

cause the computer to partially decode and decompress coded data in accordance with the post-quantization condition set by the user, thereby causing the computer to reproduce image data the same as image data reproduced by decoding and decompressing the coded data after post-quantization processing in accordance with the post-quantization condition; and cause the computer to display the image data reproduced in response to the instruction of causing the computer to partially decode and decompress the coded data.

Further, according to another embodiment of the present invention, there is provided a computer-readable recording medium recording the above-mentioned program thereon.

According to one or more embodiments of the present invention, by partially decoding and decompressing coded data in accordance with the post-quantization conditions that are set by the user, an image after post-quantization processing performed in accordance with the post-quantization conditions is displayed. Since post-quantization processing that discards codes is not actually performed, it is possible to vary the post-quantization conditions any number of times. Accordingly, it is possible for the user to easily set the most appropriate post-quantization conditions while confirming in advance the results of post-quantization processing in accordance with various post-quantization conditions. Moreover, by performing post-quantization processing of coded data under the set post-quantization conditions, it is possible to adjust the compression rate without causing generation image degradation.

Also, according to one embodiment of the present invention, provided that coded data before post-quantization processing are lossless coded data or coded data of a compression rate close to lossless, it is possible for the user to arbitrarily adjust the compression rate from a very low compression rate to a high compression rate. In addition, since post-quantization processing does not cause generation image degradation, it is possible to perform setting of post-quantization conditions, in other words, setting of the compression rate in a digital camera, for example, at an arbitrary point before and after photographing of images.

In addition, according to one embodiment of the present invention, the original image data are not handled in post-quantization processing nor partial decoding and decompression of coded data for setting post-quantization conditions. Hence, a working memory having a large capacity is not required.

Additionally, according to one embodiment of the present invention, when setting post-quantization conditions, by calling one or more of the saved post-quantization conditions, it is possible for the user to effectively set post-quantization conditions.

Additionally, according to one embodiment of the present invention, since the compression rate is displayed when setting post-quantization conditions, it is possible for the user to easily confirm the relationship between the compression rate and the degree of image degradation.

Additionally, according to one embodiment of the present invention, when setting post-quantization conditions, it is possible for the user to easily and positively confirm image degradation under the set post-quantization conditions by enlargement/reduction/scrolling of a displayed image.

Additionally, according to one embodiment of the present invention, magnification is displayed when setting post-quantization conditions. Hence, it is possible for the user to easily confirm up to what display magnification is image degradation not conspicuous under the set post-quantization conditions.

Additionally, according to one embodiment of the present invention, post-quantization conditions can be saved by averaging. Thus, by setting and saving post-quantization conditions with respect to several images, it is possible for the user to save post-quantization conditions having less influence caused by differences among images.

In addition, according to one embodiment of the present invention, it is possible to set post-quantization conditions from various perspectives, such as the resolution, position, component, image quality (layer), and compression rate of an image.

Additionally, according to one embodiment of the present invention, it is possible to perform post-quantization processing of coded data under post-quantization conditions that are selected from among the saved post-quantization conditions. Accordingly, it is possible to quickly perform, for example, post-quantization processing of coded data of a large number of images that are newly photographed and post-quantization processing of coded data of recorded images for providing a free area of a recording medium, without performing setting of post-quantization conditions in each case.

Further, according to one embodiment of the present invention, by transmitting to a server on a network post-quantization conditions that the user desires, it is possible to capture from the server coded data subjected to post-quantization processing beforehand under the conditions that the user desires.

Other objects, features and advantages of the present invention will become more apparent from the following detailed description when read in conjunction with the following drawings.

In exemplary embodiments described below, it is assumed that a processing target is JPEG 2000 coded data or Motion-JPEG 2000 coded data. In Motion-JPEG 2000, a moving image is handled by treating each of a plurality of consecutive still images as a frame. Coded data of each frame conforms to JPEG 2000.

A detailed description of JPEG 2000 is given in the above-mentioned literature ("Next Generation Image Coding Method"), for example. Here, for ease of comprehension of the embodiments of the present invention, an outline will be given of JPEG 2000.

FIGS. 1A, 1B and 1C are simplified flow charts for illustrating the algorithms of JPEG 2000. In FIGS. 1B and 1C, those steps that are the same as those corresponding steps in FIG. 1A are designated by the same reference numerals, and a description thereof will be omitted. Image data (image data of each frame when a moving image is handled), which are the target of compression coding, are divided into non-overlapping rectangular regions called tiles for each component. A process is performed on each tile for each component. However, it is also possible to make the tile size the same as the image size, that is, not to perform tiling.

In step S1, in order to improve the compression rate, color space conversion to YCrCb data from RGB data or CMY data is performed on a tiled image.

In step S2, a two-dimensional wavelet transform (discrete wavelet transform: DWT) is performed on each tile image of each component after color space conversion.

Figure 2A:
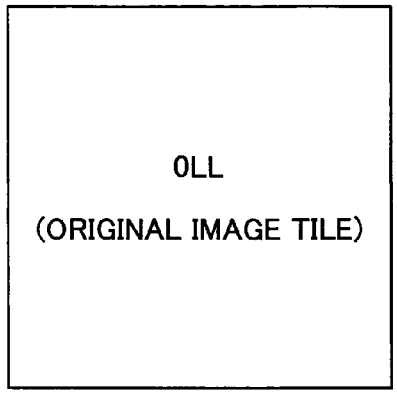
FIGS. 2A, 2B, 2C and 2D are schematic diagrams for illustrating two-dimensional wavelet transform.
Figure 2B:
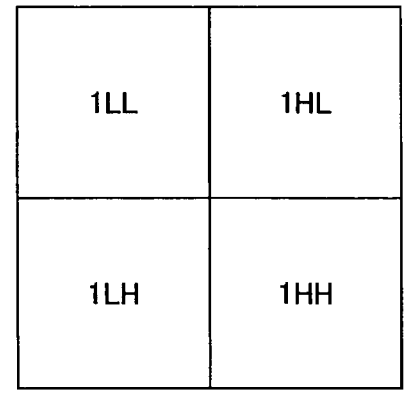
Figure 2C:
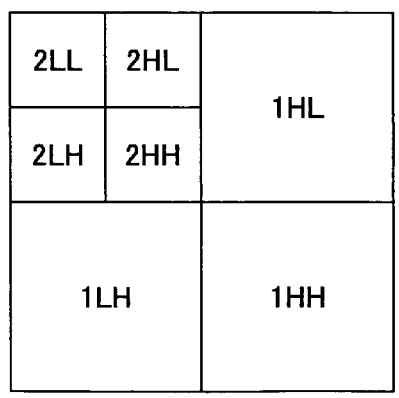
Figure 2D:
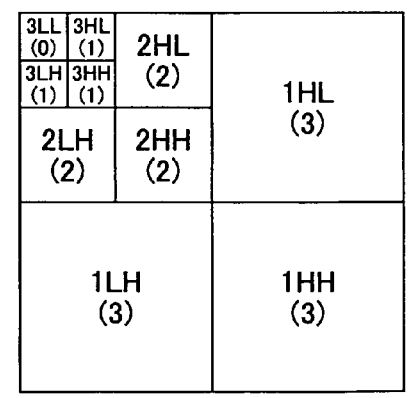

FIGS. 2A, 2B, 2C and 2D are diagrams for illustrating a wavelet transform in the case where the number of decomposition levels is 3. When a two-dimensional wavelet transform is performed on a tile image (decomposition level 0) shown in FIG. 2A, the tile image is divided into subbands of 1LL, 1HL, 1LH and 1HH as shown in FIG. 2B. When a two-dimensional wavelet transform is applied to the coefficient of the 1LL subband, the 1LL subband is divided into subbands of 2LL, 2HL, 2LH and 2HH as shown in FIG. 2C. When a two-dimensional wavelet transform is applied to the coefficient of the 2LL subband, the 2LL subband is divided into subbands of 3LL, 3HL, 3LH and 3HH as shown in FIG. 2D. Regarding the relationship between the decomposition level and the resolution level, the number in parenthesis of each subband of FIG. 2D represents the resolution level of the subband.

In step S3, the wavelet coefficients obtained by the recursive division (octave division) of such low-frequency components (coefficients of LL subband) are quantized for each subband. JPEG 2000 allows both lossless (reversible) compression and lossy (irreversible) compression. In the case of loss-less compression, the quantization step width is always 1, and quantization is not performed at this stage.

In step S4, each subband coefficient after quantization is subjected to entropy coding. A coding method called EBCOT (Embedded Block Coding with Optimized Truncation) including block division, coefficient modeling, and binary arithmetic coding is used for the entropy coding. The bit planes of each subband coefficient after quantization are coded by blocks called code blocks from an upper plane to a lower plane.

The last two steps, steps S5 and S6, are code forming processes. First, in step S5, a packet is created by collecting the codes of the code blocks generated in step S4. In the next step S6, packets created in step S5 are arranged according to a progression order and required tag information is added to the packets. In this manner, coded data in a predetermined format are created. In JPEG 2000, regarding code order control, five kinds of progression orders made by combining a resolution level, a position (precinct), a layer, and a component (color component) are defined.

In the above description, the case of performing post-quantization processing after coding the main header and the packet header and thereafter rewriting the main header (and the packet header) is taken as an example. That is, as shown in FIG. 1A, the case in which the following processes are performed: entropy coding (step S4)→packet generation by coding the packet header (step S5)→generate the main header and create a code file by joining packets (step S6)→post quantization (discard packets)→rewrite the main header.

However, it is not always necessary to discard whole packets. It is also possible to partially discard codes of bit planes included in packets. This is because a packet is structured by collecting codes of bit planes and adding thereto the code length and the like of each bit plane as a header.

Accordingly, as shown in FIG. 1B, it is also possible to perform the following processes: entropy coding (step S4)→packet generation by coding the packet header (step S15)→generate the main header and create a code file by joining packets (step S16)→post-quantization (partially discard codes of bit planes) (step S17)→code the packet header again and perform packet generation again (step S18)→generate the main header and create a code file by joining packets (step S19).

Further, of course, instead of performing post-quantization processing after generating the packet header and the main header, it is also possible to perform post-quantization processing before generating the packet header and the main header (it should be noted that "post" means discarding of an entropy code after entropy coding (step S4), and does not mean "after generating the packet header").

Accordingly, as shown in FIG. 1C, it is also possible to perform the following processes: entropy coding (step S4)→post-quantization (partially discard codes of bit planes) (step S25)→packet generation by coding the packet header (step S26)→generate the main header and create a code file by joining packets (step S26).

Fundamentally, JPEG 2000 performs the procedure of entropy coding all bit planes and discarding unnecessary codes in the above-mentioned code forming processes. Accordingly, in the process of the entropy coding, it is possible to retain the amount of codes obtained as a result of bit plane coding with respect to all code blocks (more specifically, in JPEG 2000, coding is performed by dividing one bit plane into three sub-bit planes).

Figure 3:
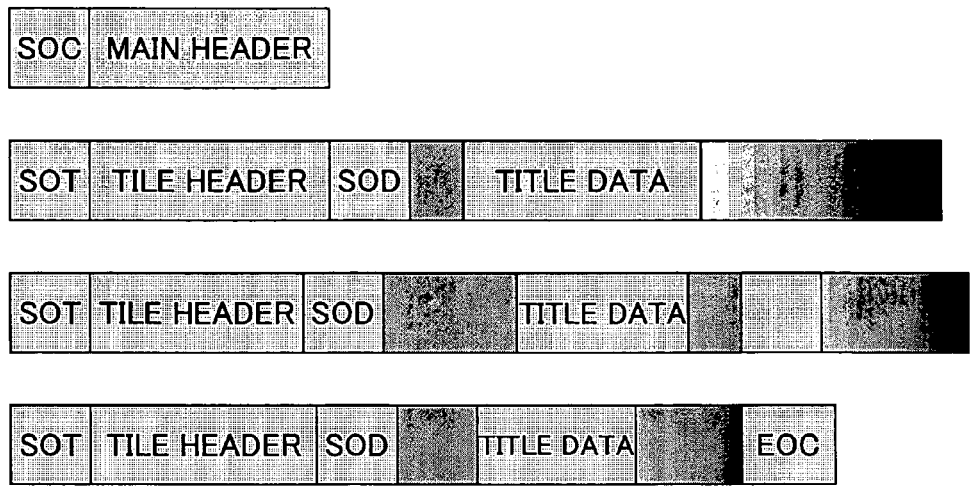
FIG. 3 is a schematic diagram for illustrating the format of coded data.

FIG. 3 shows the format of JPEG 2000 coded data thus generated. As can be seen from FIG. 3, the coded data begin with a tag called an SOC marker that represents the beginning. The SOC marker is followed by tag information called main header that describes a coding parameter, a quantization parameter, and the like. The main header is followed by coded data of each tile. The coded data of each tile begin with a tag called an SOT marker, and are constituted by tag information called a tile header, a tag called an SOD marker, and tile data having a code sequence of each tile as the component. A tag called an EOC marker, representing the end, is placed after the last tile data.

Figure 4:
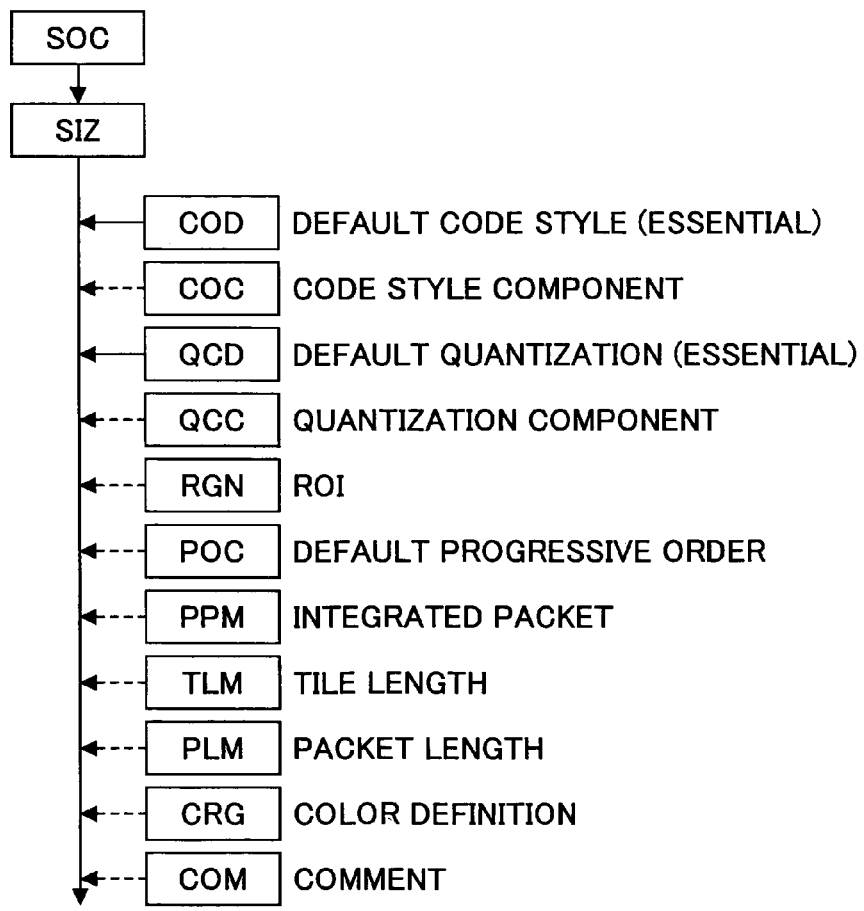
FIG. 4 is a schematic diagram showing the structure of a main header.

A description will be given of outlines of tags and tag information added to JPEG 2000 coded data. FIG. 4 shows the structure of the main header. Marker segments of SIZ, COD, and QCD are essential, but the other marker segments are optional.

Figure 5A:
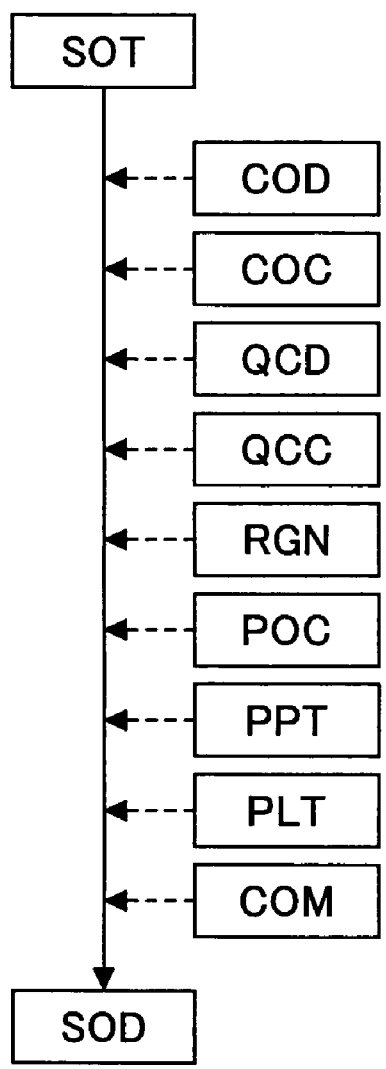
FIGS. 5A and 5B are schematic diagrams showing the structures of a tile header.
Figure 5B:
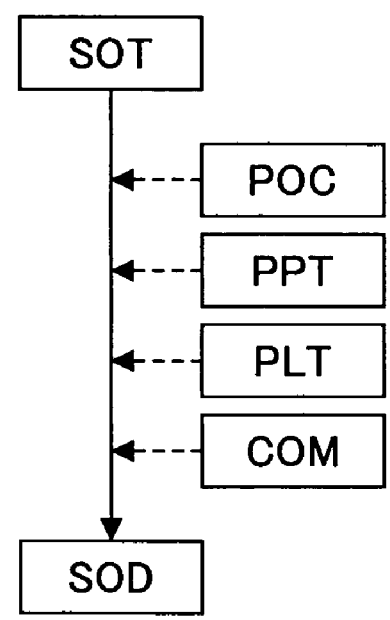

FIGS. 5A and 5B show the structures of the tile header. FIG. 5A shows the tile header added to the head of tile data. FIG. 5B shows the tile header added to the head of a divided tile unit sequence in a case where a tile is divided into a plurality of units. There is no essential marker segment in the tile header, and all marker segments are optional.

Figure 7:
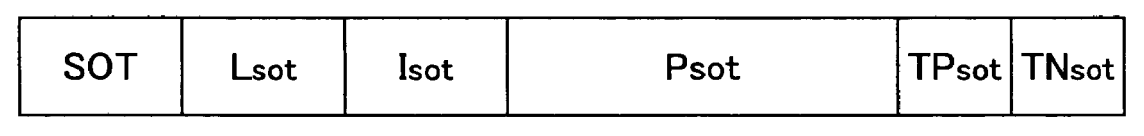
Figure 8:
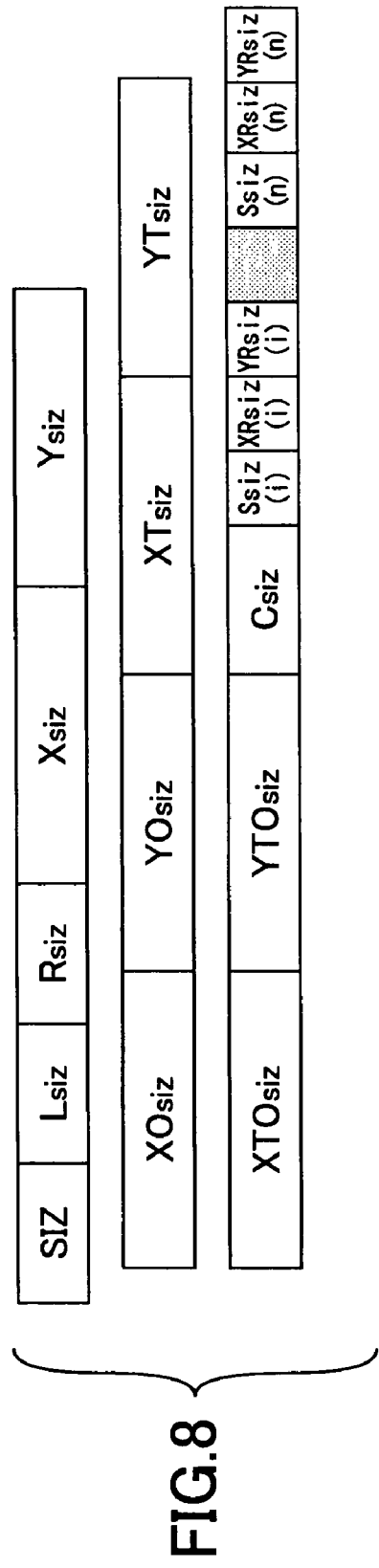
FIG. 8 is a schematic diagram showing the structure of an SIZ marker segment.
Figure 9:
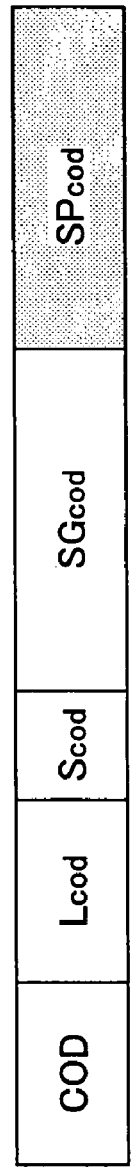
FIG. 9 is a schematic diagram showing the structure of a COD marker segment.
Figure 10:
FIG. 10 is a schematic diagram showing the structure of a COC marker segment.
Figure 11:
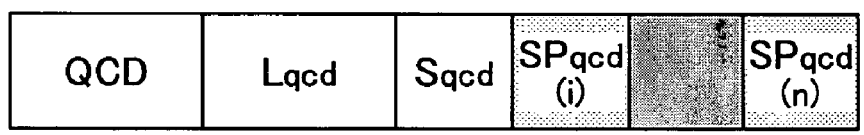
FIG. 11 is a schematic diagram showing the structure of a QCD marker segment.
Figure 12:
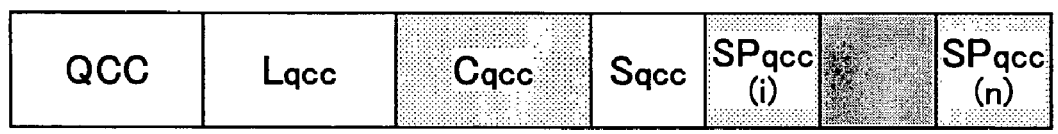
FIG. 12 is a schematic diagram showing the structure of a QCC marker segment.

FIG. 6 shows a table of markers and marker segments. FIG. 7 shows the structure of an SOT marker segment. FIG. 8 shows the structure of the SIZ marker segment. FIG. 9 shows the structure of the COD marker segment. FIG. 10 shows the structure of a COC marker segment. FIG. 11 shows the structure of the QCD marker segment. FIG. 12 shows the structure of a QCC marker segment.

Here, a brief description will be given of the precinct, the code block, the packet, and the layer. There is a size relationship of image≧tile≧subband≧precinct≧code block.

Figure 13:
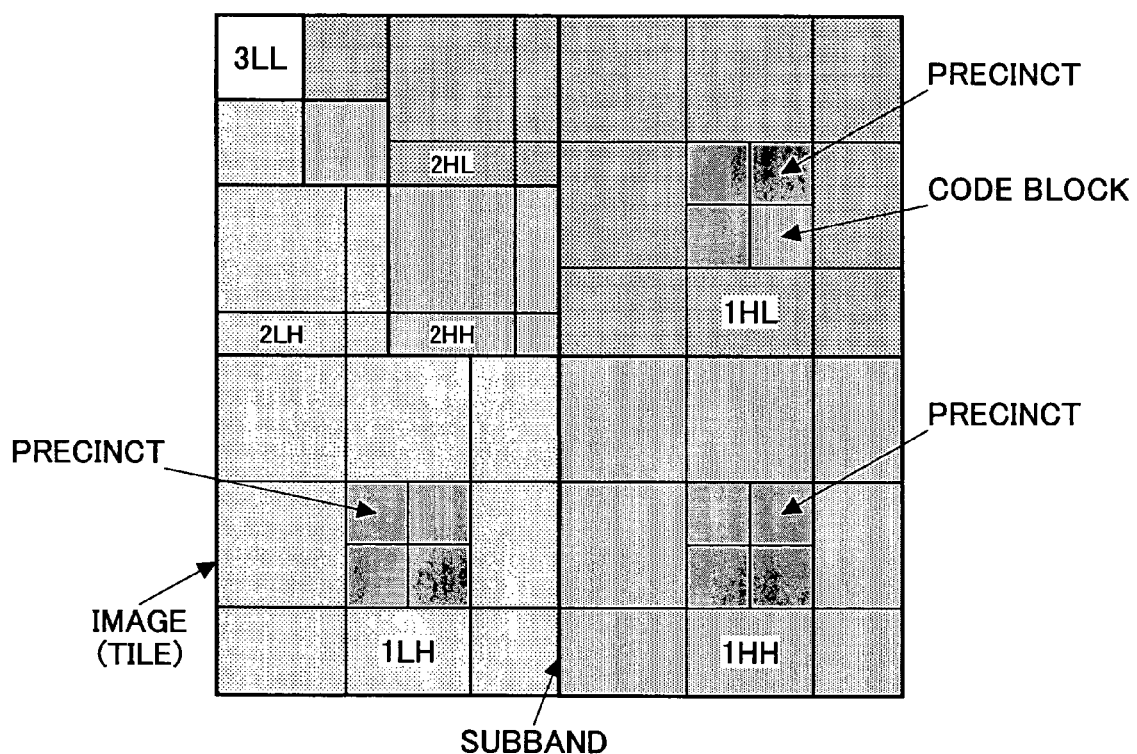
FIG. 13 is a schematic diagram for illustrating precincts and code blocks.

The precinct is a rectangular region of a subband. A set of three regions that are spatially at the same relative position in HL, LH, and HH subbands of the same decomposition level are handled as one precinct. However, in a LL subband, one region is handled as one precinct. It is also possible to make the size of a precinct the same as the size of the subband. Code blocks are rectangular regions dividing a precinct. FIG. 13 shows an example of one precinct and code blocks of the decomposition level 1. A set of three regions that are spatially at the same relative position and each indicated as a precinct in FIG. 13 are handled as one precinct.

A packet is a collection of a unit of the codes of all code blocks (for example, the codes of three bit planes: from the highest bit plane to the third bit plane) included in a precinct. A packet having empty code is also allowed. Coded data are formed by generating packets by collecting codes of code blocks, and arranging the packets according to a desired progression order. The part following the SOD relating to each tile in FIG. 3 represents a collection of packets.

The collection of packets of all precincts (that is, all code blocks, all subbands) forms a part of the codes of an entire image (for example, the codes of the highest bit plane to the third bit plane of the wavelet coefficients of the entire image), which is a layer. Accordingly, the more the number of layers decoded in decompression, the further the image quality of a reproduced image (image data) is improved. In other words, the layer is the unit of image quality. The collection of all layers forms the codes of all bit planes of the entire image.

A packet is constructed by packet data (codes), which are the main body, and a packet header added to the packet data. The packet header includes information of the length of the packet data, the number of code passes, the number of 0-bit planes, and the like.

In JPEG 2000, five progression orders, i.e., LRCP, RLCP, RPCL, PCRL, and CPRL, are defined. Here, "L" represents a layer, "R" represents a resolution level, "C" represents a component, and "P" represents a precinct (position).

In the case of the LRCP progression, handling of packets (arrangement of packets in coding, and interpretation of packets in decoding) is performed in the order of the following for a loop in which L, R, C and P are nested in this order.

```
for (layer){
    for (resolution level){
        for (component){
            for (precinct){
                arrange packets: in coding
                interpret packets: in decoding
            }
        }
    }
}
```

Accordingly, in decoding, when the number of layers is set to a smaller value, it is possible to handle only the packets of the layers up to the set number of layers and to partially decode and decompress coded data in terms of image quality. It is also possible to decode and decompress only packets of partial resolution levels by controlling the outermost for loop, for example, the for loop of the resolution level, in a decoder.

Figure 14:
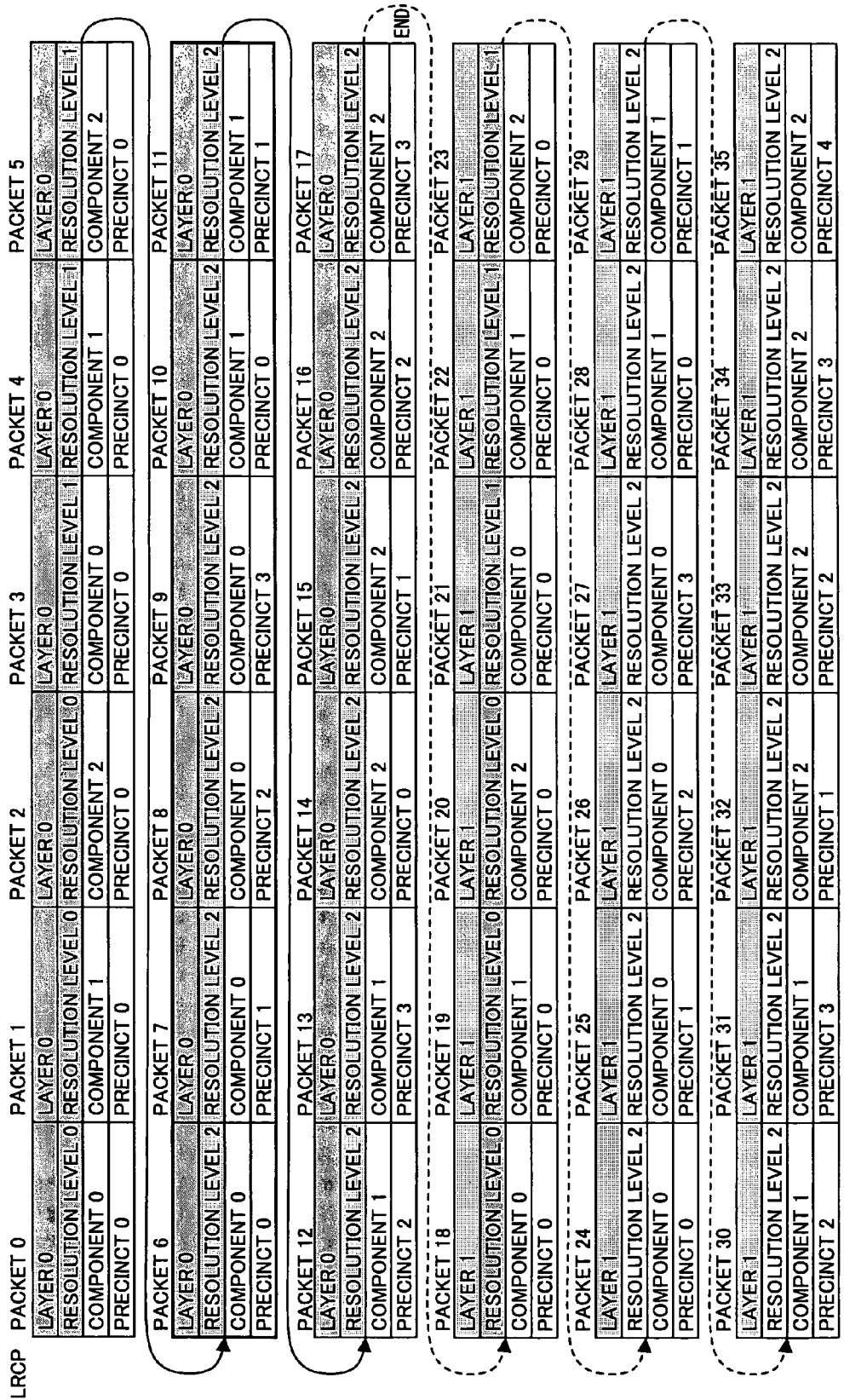
FIG. 14 is a schematic diagram for illustrating the hierarchy of packets in coded data of an LRCP progression and partial decoding and decompression.

Giving an specific example, in the case of image size=100 pixels×100 pixels (without tile division), the number of layers=2, the number of resolution levels=3 (level 0-2), the number of components=3, the precinct size=32×32, and the LRCP progression, 36 packets are interpreted in the order as shown in FIG. 14. In this example, when the number of layers=1 is set, it is possible to end the decoding and decompression operation at the stage of "END" in FIG. 14. Additionally, JPEG 2000 allows compression by discarding codes of coded data (post-quantization). When performing post-quantization on coded data subjected to decoding and decompression such as those in this example, the packets after "END" are discarded, the EOC marker is added after the last remaining packet, and rewriting of required marker segments is performed.

It should be noted that the layer number and the resolution level, for example, are not described in the packet header. The layer and the resolution level of a packet are determined by the for loop in which the packet is handled by forming the above-mentioned for loop according to the progression order described in the COD marker segment.

In addition, in the case of the RLCP progression, packets are handled in the order as follows.

```
for (resolution level){
    for (layer){
        for (component){
            for (precinct){
                arrange packets: in coding
                interpret packets: in decoding
            }
        }
    }
}
```

Accordingly, in decoding, when the number of resolution levels is set to a smaller value, it is possible to handle only the packets up to the set number of resolution levels and to partially decode and decompress the coded data in terms of resolution level. Even in this case, it is also possible to decode and decompress packets of a unit of layers by controlling, for example, the for loop of layer in the decoder. Of course, the decoder is capable of determining segmentations of packets and determining the layer, resolution, component, and precinct of a packet depending on the execution position in the for loop. Thus, it is possible for the decoder to determine whether a packet is necessary for partial decoding (whether to skip the packet, suspending decoding until the next packet).

Figure 15:
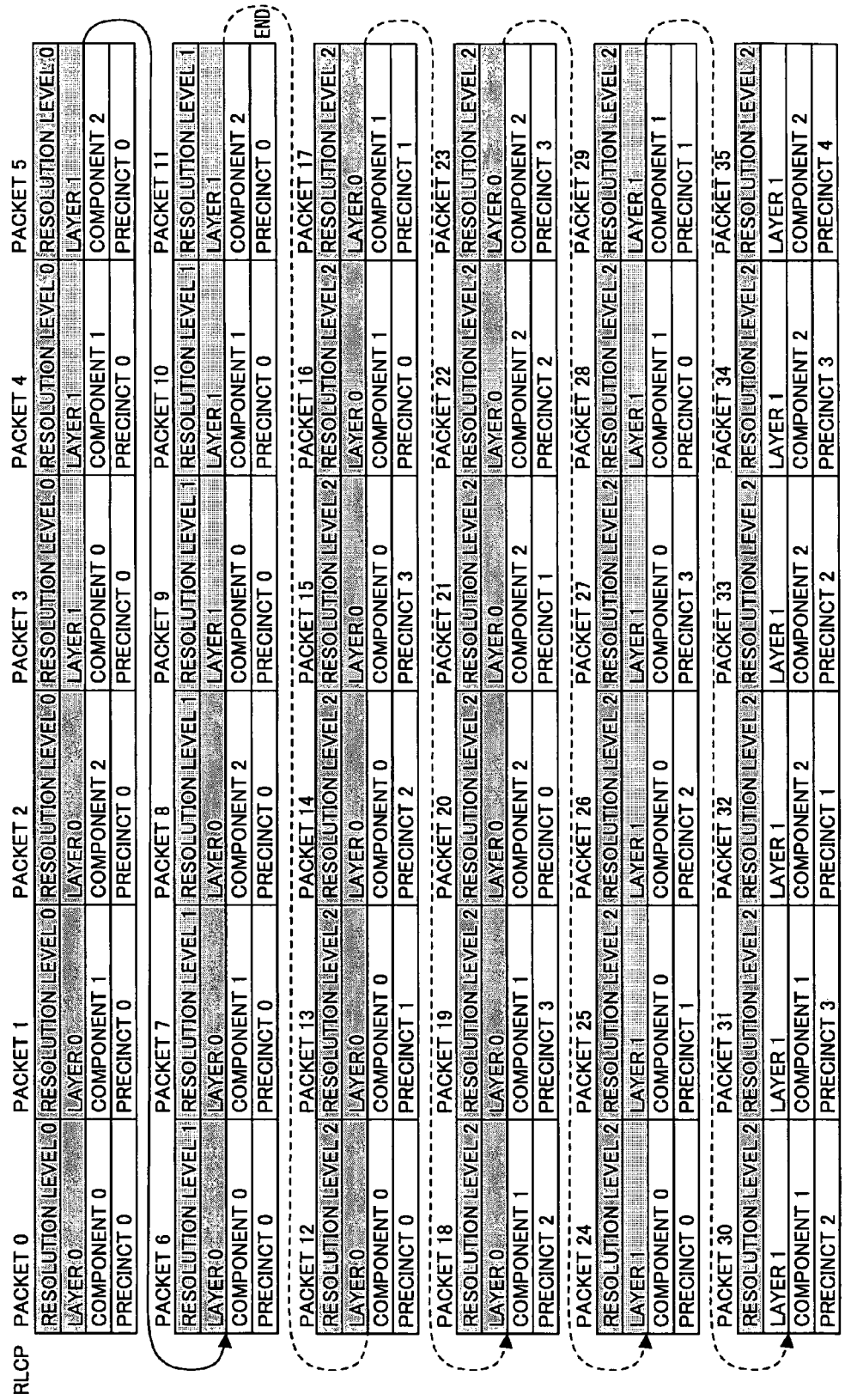
FIG. 15 is a schematic diagram for illustrating the hierarchy of packets in coded data of a RLCP progression and partial decoding and decompression.

Giving a specific example, in the case of image size=100 pixels×100 pixels (without tile division), the number of layers=2, the number of resolution levels=3 (level 0-2), the number of components=3, and the precinct size=32×32, 36 packets are interpreted in the order as shown in FIG. 15. In this example, when the number of resolution levels=2 is set, it is possible to end the decoding and decompression operation at the stage of "END" in FIG. 15. When performing post-quantization processing on coded data subjected to decoding and decompression such as those in this example, the packets after "END" are discarded, the EOC marker is added after the last remaining packet, and rewriting of required marker segments is performed.

Further, in addition to the for loops of the above-mentioned progression orders, there is a loop relating to the tile. Although not regulated in the JPEG 2000 standard, generally, a decoder performs the following operation.

```
while (tile exists){
    for (resolution level){
        for (layer)}
            for (component){
                for (precinct){
                    interpret packets
                }
            }
        }
    }
}
```

A tile number is described in the SOT marker segment of a tile header, and a tile size and an image size are described in the SIZ marker segment of the main header. Hence, when the image size is rewritten to ½, for example, the decoder determines that there are tiles the number of which falls within the range of the size and tries to decode the codes of those tiles having the tile numbers within the range. That is, it is possible to decode and decompress only the codes of a partial region of the image.

A description will now be given of a generation method of coded data having a multi-layer structure. As mentioned above, the encoder that conforms to JPEG 2000 performs coding by dividing one bit plane into three sub-bit planes. However, for simplicity, it is assumed that a result of entropy coding of "each bit plane of each subband" is retained. FIG. 16 shows an example of a result of entropy coding. The numbers in FIG. 16 represent amounts of codes (unit: bytes). The total amount of codes is 26,553 bytes.

In this example, it is assumed that the codes are divided into 10 layers and the amount of codes of each layer is approximately the same. The reference amount of codes for one layer is 2,655 bytes.

In this example, a hierarchy is provided in advance for "each bit plane of each subband." The hierarchy corresponds to a sort of the level of importance of the codes of "each bit plane of each subband." The level of importance may be determined in terms of image quality or PSNR, for example, depending on the case. Additionally, in the typical Lagrange rate control method that uses Lagrange's method of undetermined constant numbers, the above-mentioned hierarchy is ranked by using the index of "the amount of code/the increase in the error in coding (error in quantization) when the code is discarded." In this example, the hierarchy of 0 (the most important)-83 is ranked as shown in FIG. 17 mainly in terms of image quality.

Figure 18:
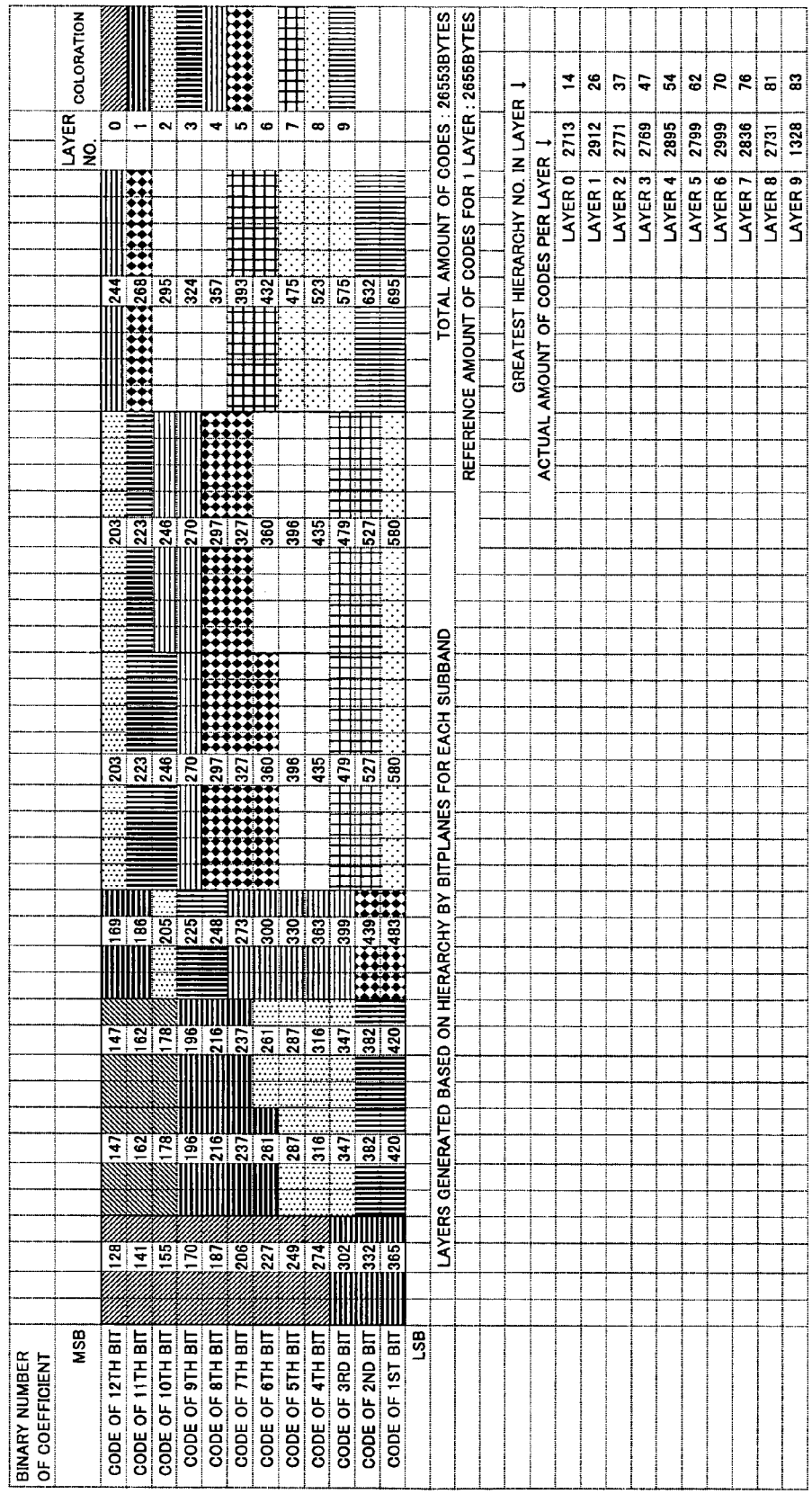
FIG. 18 is a schematic diagram showing a layer structure.

In this example, a layer is formed such that the amount of codes is sequentially added in accordance with the above-mentioned hierarchy until the addition result exceeds the reference amount of codes for one layer. In this manner, layers 0-9 are formed as shown in FIG. 18.

Figure 19:
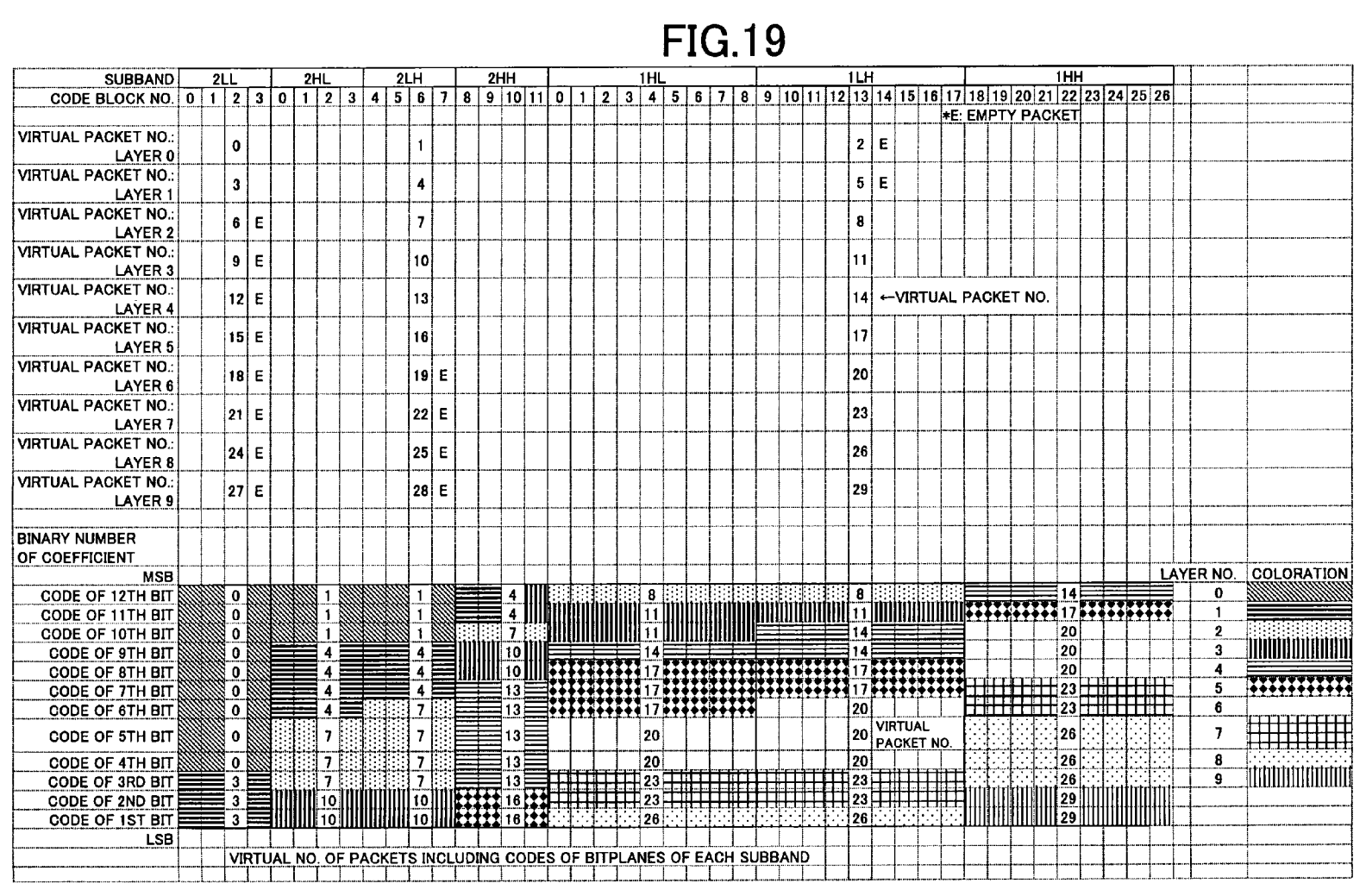

The number of packets included in one layer is the same as that of precincts. However, there is a case where a layer that does not include the codes in some precincts (in this example, the codes of 1HL through 1HH) is generated, such as the layer 0 of FIG. 18. With respect to such a layer, "empty packets" are arranged as the codes so as to match the number of packets included in all layers. Originally, a packet does not have a "number." However, for convenience of explanation, a "virtual packet number" is assumed. FIG. 19 shows "the codes of each bit plane of each subband" structuring the layers of this example and the packet that includes "the codes of each bit plane of each subband" by using the virtual packet numbers.

Embodiment 1

Figure 20:
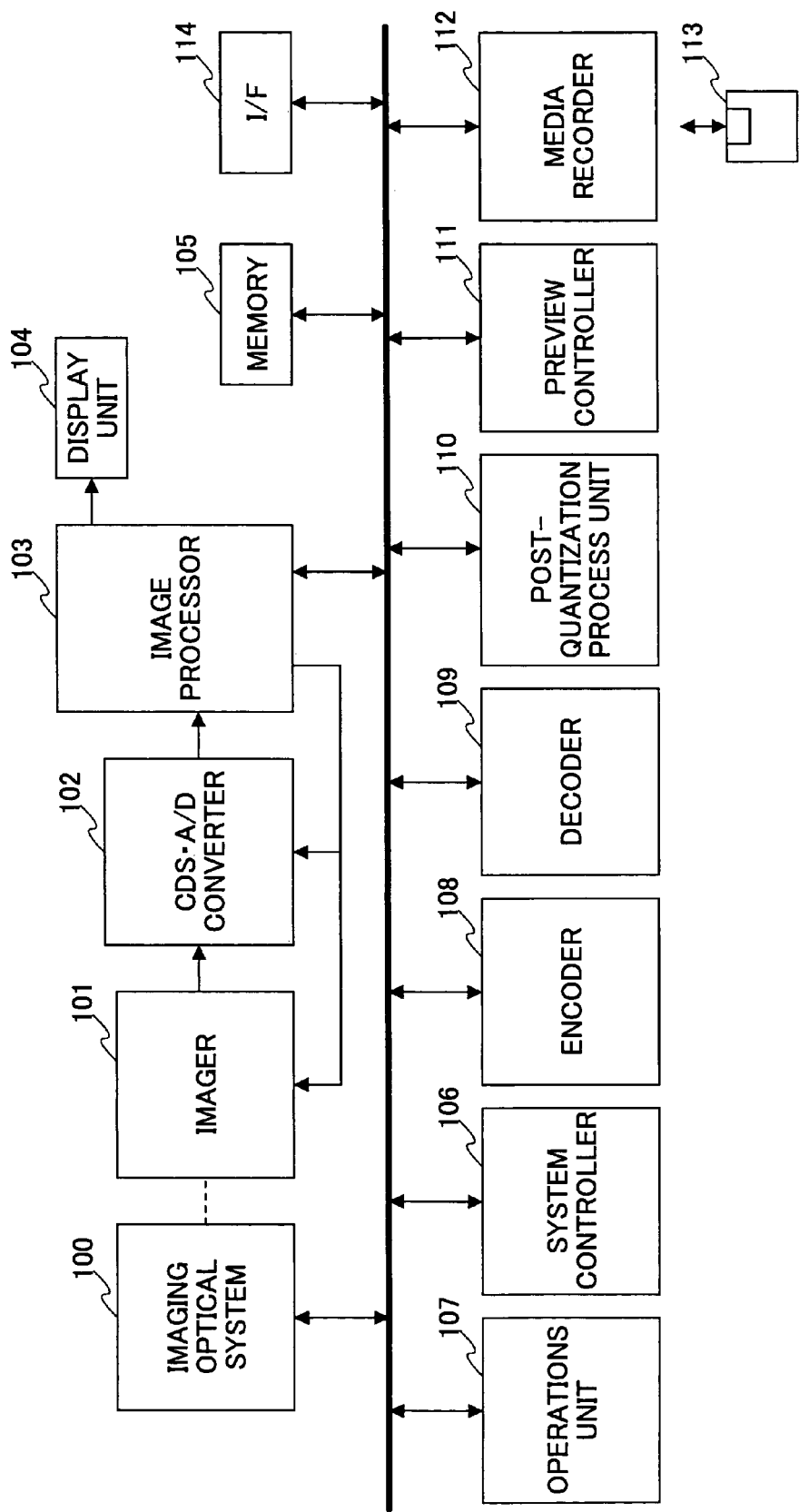
FIG. 20 is a block diagram for illustrating an embodiment of the present invention.

FIG. 20 is a block diagram for illustrating one embodiment of the present invention. In this embodiment, the teachings described herein are applied to an electronic camera device such as a digital still camera and a digital video camera.

Referring to FIG. 20, an electronic camera device 10 includes a general imaging optical system 100, a CCD-type or MOS-type imager 101, a CDS•A/D converter 102, an image processor 103, a display unit 104, a memory 105, a system controller 106, an operations unit 107, an encoder 108, a decoder 109, a post-quantization process unit 110, a preview controller 111, a media recorder 112, and an interface unit 114.

The imaging optical system 100 is structured by an aperture mechanism, a shutter mechanism, and the like. The imager 101 performs color separation on an optical image imaged by the imaging optical system 100 and then converts the optical image into an electronic signal in accordance with the amount of light. The CDS•A/D converter 102 samples an output signal of the imager 101 and converts the output signal into a digital signal. The CDS•A/D converter 102 comprises a correlative double sampling (CDS) circuit and an A/D conversion circuit.

The image processor 103 comprises a high-speed digital signal processor that is controlled by, for example, a program (micro code). The image processor 103 performs signal processing such as a gamma correction process, a white balance adjustment process, and an enhancing process for edge enhancement. Also, the image processor 103 controls the imager 101, the CDS•A/D converter 102, and the display unit 104. Further, the image processor 103 detects information for automatic focus control, automatic exposure control, white balance adjustment, and the like. The display unit 104 is a liquid crystal display apparatus, for example. The display unit 104 is used for displaying an image such as a monitoring image (through image) and a photographed (digitally captured) image, and for displaying other information.

The imaging optical system 100, the imager 101, the CDS•A/D converter 102, and the image processor 103, which are mentioned above, form an imaging mechanism for obtaining image data by photographing a still image or a moving image.

The encoder 108 is compliant with JPEG 2000 and is used for a compression coding process of the photographed image data. The decoder 109 is compliant with JPEG 2000 and is used for a decompression decoding process of coded data that conform to JPEG 2000. It should be noted that the decoder 109 is used also for partial decoding and decompression of coded data in a preview operation for setting a post-quantization condition, which will be described later. The post-quantization process unit 110 performs post-quantization processing of coded data. As mentioned above, the encoder 108, conforming to JPEG 2000, is generally provided with functions of discarding unnecessary codes in the code forming process after entropy coding and controlling the arrangement of the codes. Hence, these functions may also be used as the post-quantization process unit 110.

The preview controller 111 comprises a mechanism for performing control for reproducing an image identical to that obtained when coded data subjected to post-quantization processing under various conditions are decoded and decompressed. The reproduction is performed by partially decoding and decompressing coded data before post-quantization processing in an operation for setting the post-quantization conditions, which will be described later. In other words, the preview controller 111 and the decoder 109 comprises a mechanism for partially decoding and decompressing coded data for setting the post-quantization conditions.

In this embodiment, the preview controller 111 causes the decoder 109 to perform partial decoding and decompression of coded data by directly controlling the internal operation of the decoder 109. However, as is described below, instead of directly controlling the decoder 109, it is also possible to cause the decoder 109 to perform partial decoding and decompression of coded data by rewriting the header information of the coded data by the preview controller 111. The present invention also includes such embodiment.

The media recorder 112 performs writing/reading of information with respect to a recording medium 113. When photographing a still image, coded data of the image are recorded on the recording medium 113 by the media recorder 112 as an image file in the JPEG 2000 file format. When photographing a moving image, coded data of the image are recorded on the recording medium 113 as an image file in the Motion-JPEG 2000 file format. The recording medium 113 may be any of various kinds of memory cards, for example. The electronic camera device 10 can exchange information with an external personal computer and the like via the interface (I/F) 114 over a wired or wireless transmission channel or a network.

The system controller 106 comprises a microcomputer, for example. The system controller 106 controls the shutter mechanism, the aperture mechanism, and a display magnification mechanism of the imaging optical system 100, the image processor 103, the encoder 108, the decoder 109, the post-quantization process unit 110, the preview controller 111, the media recorder 112 and the like in response to user operational information that is input from the operations unit 107 and information supplied from the image processor 103, for example. The memory 105 is used as a temporary storing area of image data and coded data thereof, for example. In addition, the memory 105 is also used as a working storage of the image processor 103, the system controller 106, the encoder 108, the decoder 109, the post-quantization process unit 110, the preview controller 111, and the media recorder 112, for example.

The operations unit 107 is provided with operation buttons serving as a way for arbitrarily setting post-quantization conditions by a user, in addition to general operation buttons (switches) for operating the electronic camera device 10. The above-mentioned operation buttons are, for example, L(+) and L(−) buttons for indicating an increase and decrease of the number of layers, R(+) and R(−) buttons for indicating an increase and decrease of the resolution, C(+) and C(−) buttons for indicating an increase and decrease of the number of components, and P(+) and P(−) buttons for indicating an increase and decrease of the number of tiles, respectively, for example. The operations unit 107 is further provided with buttons for indicating modification, i.e., enlargement, reduction and scrolling, of a display image.

Additionally, it is also possible to realize all or a part of the functions of the encoder 108, the decoder 109, the post-quantization process unit 110, and the preview controller 111 by a program by using the same microcomputer as the system controller 106 or another microcomputer.

In the electronic camera device 10, various operation modes may be selected. However, here, a description will be given of inherent operation modes of one embodiment of the present invention.

First, a description will be given of an operation mode A in which the user sets a post-quantization condition for each newly photographed image or recorded image.

FIG. 21 is a flow chart for illustrating the operation mode A. The operation flow shown in FIG. 21 is controlled by the system controller 106.

In step S100, coded data of one image are captured into the memory 105.

Specifically, for example, the user presses a release button of the operations unit 107 and photographs an image. The image data are compressed and coded by the encoder 108 in a lossless manner (or at a low compression rate close to lossless), and the coded data thus obtained are written to the memory 105.

Alternatively, coded data of an image recorded on the recording medium 113 are read by the media controller 112 and written to the memory 105. Regarding a selection method of an image on this occasion, it is possible to adopt, for example, a general method of displaying thumbnails of images already recorded on the recording medium 113 on the display unit 104, moving a cursor on the display of the display unit 104 to a desired image by the user operating the operations unit 107, and making the selection from the operations unit 107.

In step S105, all codes of the coded data that are captured in step S100 are decoded and decompressed by the decoder 109. In step S110, the reproduced image data are stored in the memory 105 and the corresponding image is displayed on the display unit 104 by the image processor 103.

In step S115, the system controller waits for an input of an instruction by the user from the operations unit 107. When the instruction is input, the system controller 106 controls the operation flow in accordance with the contents of the instruction in step S116.

When the input instruction is an instruction to enlarge/reduce or scroll the image, a corresponding command is given to the image processor 103 by the system controller 106, and corresponding control (process) is performed in the image processor 103 in step S120. Thus, an image on the display of the display unit 104 is enlarged, reduced, or scrolled in step S110. Since the electronic camera device 10 includes a mechanism for enlarging/reducing/scrolling a display image, it is possible for the user to display an image at a desired position with a necessary magnification and to confirm the conditions of the image.

When the input instruction relates to the increase and decrease of the layers, the resolution, the components, or the tiles for setting a post-quantization condition, a corresponding command is given to the preview controller 111 by the system controller 106. In step S125, partial decoding and decompression of coded data in accordance with a current post-quantization condition is performed by the decoder 109 under the control of the preview controller 111. Then, in step S110, the reproduced image is displayed on the display unit 104, which is a preview operation.

A specific description will be given of step S125. In this embodiment, the user can arbitrarily set the post-quantization condition by setting a condition relating to the number of layers, the number of resolution levels, the number of components, and the tile (position) independently or in a combination of two or more of them.

A description will be given of a case where an instruction to decrease the number of layers is input by pressing down the L(−) button of the operations unit 107. As mentioned above, in the decoder 109, decoding and decompression are performed while interpreting packets by passing the packets through the nested loops corresponding to the progression order. When an instruction to decrease the number of layers is input, the preview controller 111 partially decodes and decompresses coded data, assuming that the coded data are to have a lesser number of layers, by decreasing the number of times of looping of the layer loop for one or a predetermined number from the current number of times. In the case of coded data of 30 layers, for example, the number of layers to be decoded and decompressed is decreased to 29 by a first input of an instruction to decrease the number of layers, then decreased to 28 by a second input of the instruction, and so on. To the contrary, when an instruction to increase the number of layers is input by pressing down the L(+) button of the operations unit 107, the preview controller 111 increases the number of times of looping of the layer loop in the decoder 109 for one or a predetermined number to a current number of times.

With such a preview operation, by partially decoding and decompressing coded data so as to reproduce and display an image the same as that obtained in the case where post-quantization processing of varying the number of layers is performed, it is possible for the user to confirm in advance, i.e., before performing post-quantization processing, the conditions of degradation of an image obtained when post-quantization processing of decreasing the number of layers is performed thereon.

Figure 22A:
FIG. 22A is a schematic diagram showing an image obtained by decoding and decompressing all layers of coded data having a 10-layer structure.
Figure 22B:
FIG. 22B is a schematic diagram showing an image obtained by decoding and decompressing the top seven layers of the coded data having the 10-layer structure.
Figure 22C:
FIG. 22C is a schematic diagram showing an image obtained by decoding and decompressing the top three layers of the coded data having the 10-layer structure.

For the purpose of reference, FIGS. 22A, 22B and 22C show examples of images that are obtained by performing decoding and decompression for all layers, the top seven layers, and the top three layers with respect to coded data having a ten-layer structure, respectively. Referring to FIGS. 22A through 22C, it is recognized that the texture of the face is lost as the number of layers to be decoded and decompressed is reduced.

In addition, it is also possible to use a method of displaying an indicator that indicates the total number of layers and the number of layers currently displayed and designating the number of layers to be decoded and decompressed (setting the post-quantization condition relating to the layers) by operating the indicator. An embodiment of the present invention also includes such an interface.

When an instruction to reduce the resolution is input by pressing down the R(−) button of the operations unit 107, the preview controller 111 partially decodes and decompresses coded data, assuming a lower resolution, by decreasing the number of times of looping of the resolution loop in the decoder 109 for one or a predetermined number from a current number of times. To the contrary, when an instruction to increase the resolution is input by pressing down the R(+) button, the preview controller 111 increases the number of times of looping of the resolution loop in the decoder 109 for one or a predetermined number from the current number of times.

With such a preview operation, by partially decoding and decompressing coded data so as to reproduce and display an image the same as that obtained in the case where post-quantization processing of varying the resolution is performed, it is possible for the user to confirm in advance, i.e., before performing post-quantization processing, the conditions of degradation of an image obtained when post-quantization processing of varying the resolution is performed thereon.

In addition, it is also possible to use a method of displaying an indicator that indicates the total number of resolution levels and the number of resolution levels currently displayed, and designating the number of resolution levels to be decoded and decompressed (setting the post-quantization condition relating to the resolution) by operating the indicator. An embodiment of the present invention also includes such an interface.

When an instruction to decrease or increase the number of tiles is input by pressing down the P(−) button or the P(+) button of the operations unit 107, the preview controller 111 controls the tile loop in the decoder 109 such that the number of tiles to be decoded and decompressed is decreased or increased. A specific example of such control is given below.

Coded data subjected to compression coding by dividing an image into 5×5 tiles, as shown in FIG. 23A, is provided as an example. With a first input of an instruction to decrease the number of tiles, the tile loop in the decoder 109 is controlled such that the packets of tiles No. 0, No. 5, No. 10, No. 15, and No. 20, which are shaded in FIG. 23B, are not decoded and decompressed. With a second input of the instruction to decrease the number of tiles, the tile loop in the decoder 109 is controlled such that the packets of the tiles shaded in FIG. 23C are not decoded and decompressed. With a third input of the instruction, the tile loop is controlled such that the packets of the tiles shaded in FIG. 23D are not decoded and decompressed. With a fourth input of the instruction, the tile loop is controlled such that the packets shaded in FIG. 23E are not decoded and decompressed. In this manner, the packets to be decoded and decompressed are decreased from the outside of the image in the clockwise direction. When an instruction to increase the number of tiles is input, the tile loop is controlled to increase the number of tiles to be decoded and decompressed, which is just the reverse of the case of the instruction to decrease the number of tiles.

With such a preview operation, by partially decoding and decompressing coded data so as to reproduce and display an image the same as that obtained in the case where post-quantization processing of varying the number of tiles (performing clipping by tiles) is performed, it is possible for the user to confirm in advance, i.e., before performing post-quantization processing, the conditions of an image after the post-quantization processing.

In the above-mentioned example, the increase and decrease of the number of tiles are directed. However, it is also possible to display on the display of the display unit 104 tile division lines overlapping an image, and for the user to designate one or more tiles on the display or by tile numbers and the like, so as to set the post-quantization condition relating to the tiles. The present invention also includes such an interface.

Additionally, as for the "positions" of an image, there are the precincts in addition to the tiles. Post-quantization processing by discarding codes by precincts is also allowed. Thus, a preview operation designating a precinct is also allowed. The present invention also includes such an embodiment.

When an instruction to decrease the number of components is input by pressing down the C(−) button of the operation unit 107, the preview controller 111 controls the component loop in the decoder 109 such that only packets of luminance are decoded and decompressed. That is, a monochrome image is reproduced and displayed. Thereafter, when an instruction to increase the number of components is input by pressing down the C(+) button, the preview controller 111 controls the component loop in the decoder 109 such that packets of luminance and color difference are decoded and decompressed. Accordingly, a color image is reproduced and displayed.

With such a preview operation, by partially decoding and decompressing coded data so as to reproduce and display an image the same as that obtained in the case where post-quantization processing of varying the number of components is performed, it is possible for the user to confirm in advance, i.e., before performing post-quantization processing, the conditions of an image after the post-quantization processing.

The preview controller 111 retains control parameters (which also are post-quantization conditions) for partial decoding and decompression as mentioned above in a control parameter temporary storing area of the memory 105. The preview controller 111 controls the decoder 109 in accordance with the control parameters. When an instruction to increase or decrease the number of layers is input, for example, the preview controller 111 updates only the control parameter relating to layers, and retains the other control parameters as they are. When an instruction to decrease the number of layers is input and the number of layers to be decoded and decompressed is decreased, and thereafter an instruction to reduce the resolution is input, for example, the decoder 109 is controlled such that decoding and decompression of further reduced resolution are performed while maintaining the current number of layers. Accordingly, with a preview operation, it is possible to confirm in advance the conditions of an image subjected to post-quantization processing of varying one or a plurality of factors among the layer, resolution, component and tile (or precinct).

According to the above-mentioned preview operations, it is possible to display images after post-quantization processing under various conditions on the display unit 104. The user can easily confirm degradation and the like of an image due to post-quantization processing by enlarging/reducing or scrolling the display image if necessary. On this occasion, support information for user determination, for example, the compression rate or display magnification of the current image is also displayed on the display unit 104. When the display magnification is displayed, the user can determine up to what display magnification the image degradation is not conspicuous under the current post-quantization conditions. When the compression rate is displayed, it is possible to easily confirm the relationship between the compression rate and the image degradation.

When the user determines that a satisfactory result is obtained in the preview operation, the user can input an image saving instruction from the operations unit 107. When the image saving instruction is input, in step S135, a post-quantization process of coded data is carried out in accordance with the control parameters saved in the control parameter temporary storing area of the memory 105, that is, the post-quantization conditions that are set by the user. The coded data after the post-quantization processing have the same number of layers, resolution levels, and components as those of the currently displayed image. When the coded data are decoded and decompressed, then the image identical to that currently displayed is reproduced and displayed. In step S136, the coded data after the post-quantization processing are recorded on the recording medium 113 by the media recorder 112. A specific example of this post-quantization will be given later.

When the user wishes to save the set post-quantization condition, the user inputs a condition record instruction from the operations unit 107. When the condition record instruction is input, in step S140, the control parameters saved in the control parameter temporary storing area of the memory 105, that is, the post-quantization conditions, are written to a condition saving area of the memory 105 by the system controller 106. As mentioned above, the electronic camera device 10 includes a mechanism for saving the post-quantization condition that is set by the user.

In addition, it is also possible to record the compression rate in the condition saving area together with or instead of the control parameters. This is because, in a case where post-quantization processing of discarding codes from a lower layer is performed on multi-layer coded data, or a case where post-quantization processing of discarding codes of a sub-bit plane of packets on single-layer coded data, if the compression rate is found as a post-quantization condition, post-quantization processing can be performed until the compression rate is achieved. The present invention also includes such an embodiment of storing the compression rate as the post-quantization condition.

The user can call and use the control parameters saved in the condition saving area of the memory 105, that is, the post-quantization conditions, by inputting a condition call instruction to the operations unit 107. When the condition call instruction is input, in step S130, the contents of the control parameters saved in the condition saving area, that is, the post-quantization conditions, are supplied to the image processor 103 by the system controller 106 and are displayed on the display unit 104. It is preferable that the display format be user-friendly. The contents of the post-quantization conditions are displayed as follows, for example.

(1) 17 layers/30 layers
(2) up to resolution level 4
(3) 17 layers/30 layers, up to resolution level 4
(4) 16 tiles/25 tiles
(5) monochrome
(6) compression rate (=amount of codes/amount of codes of all bit planes)

Here, condition (1) represents post-quantization processing that leaves only the codes of the top 17 layers of 30 layers. Condition (2) represents post-quantization processing that discards the codes of resolution level 5 and higher levels. Condition (3) represents post-quantization processing that leaves only the codes of the top 17 layers of 30 layers and of the resolution level 0-4. Condition (4) represents post-quantization processing that leaves the codes of 16 tiles of 25 tiles by sequentially discarding the codes from the outer tiles, for example. Condition (6) represents post-quantization processing that discards codes by layers or sub-bit planes.

In step S131, when the user selects one of the post-quantization conditions displayed on the display unit 104 via the operations unit 107, the post-quantization condition selected by the system controller 106, that is, the control parameter, is written to the control parameter temporary storing area of the memory 105. In other words, the user can call and set the saved control parameter, i.e., the post-quantization condition. In step S125, the operation of the decoder 109 is controlled by the preview controller 111 in accordance with the post-quantization condition, and image data the same as that in the case where post-quantization processing is performed under the post-quantization condition is reproduced. The reproduced image data are displayed as an image on the display unit 104 in step S110. Thereafter, it is possible for the user to vary the post-quantization condition as mentioned above or to direct that the image be saved.

When it is required to process coded data of another image, the user inputs a continuation instruction from the operations unit 107. When the continuation instruction is input, the process of the system controller 106 returns to step S100. When the user wishes to end the operation mode, the user inputs an end instruction from the operations unit 107. With the input of the end instruction, the system controller 106 ends the operation mode.

A further description will be given of step S140: condition recording. The user can designate an image quality mode (for example, high quality or economy) when the user inputs the condition record instruction, or at the beginning of the operation mode A. When the image quality mode is designated, in step S140, the system controller 106 classifies the post-quantization conditions (control parameters) into image quality modes, and causes the condition saving area of the memory 105 to save the post-quantization conditions. When the post-quantization conditions are recorded for each of the image quality modes in this manner, it is convenient for selecting the post-quantization condition, which is mentioned above in relation to steps S130 and S131.

In a case where such condition recording by image quality modes is performed, when a post-quantization condition of the same kind is additionally recorded to the same image quality mode, it is also possible to set in advance performing a process of averaging the post-quantization conditions. When such setting is made, if there is an instruction to record a compression rate when another compression rate is already recorded as the post-quantization condition with respect to an image quality mode, for example, the system controller 106 calculates the average compression rate of the compression rate that is already recorded and the compression rate to be added. Then, the system controller 106 rewrites the compression rate in the condition saving area to the calculated average compression rate. According to such an averaging process, by designating the same image quality mode and setting and recording post-quantization conditions by the user based on the preview operation with respect to several images, it is possible for the user to record post-quantization conditions having small influence caused by difference among images. In addition, it is also possible for the user to set one of the recorded post-quantization conditions as the default. Alternatively, it is also possible to automatically set the post-quantization condition that is used last or used most frequently to the default. Especially, the averaged post-quantization condition is preferable for the default.

In this embodiment, the number of layers is increased and decreased by pressing down the L(+) and L(−) buttons, respectively. However, when the L(−) button is pressed down once, for example, it is also possible to successively carry out partial decoding and decompression corresponding to respective numbers of layers, the numbers being less than the current number of layers, to arrange and display several reproduced images on the display unit 104, and set the number of layers by the user selecting one of the displayed images. The same may be applied to the number of resolution levels and the number of tiles. Of course, the present invention also includes such embodiment.

A description will be given of the post-quantization process of step S135. As mentioned above, in the post-quantization process, it is necessary to rewrite header information in addition to discarding codes of unnecessary packets, rearranging the remaining packets if necessary, and adding the EOC marker after the last packet. A description will be given of several specific examples of relatively simple post-quantization processes.

In the post-quantization process that discards packets of the bottom n layers of coded data of the LRCP progression, packets of the bottom n layers are discarded. The number of layers described in SGcod of the COD marker segment (refer to FIG. 9) is varied to a value reduced by n.

In the post-quantization process that decreases the number of resolution levels of coded data of the RLCP progression or the RPCL progression by n, packets corresponding to the bottom n levels are discarded. The values of Xsiz, Ysiz, XTsiz, and YTsiz of the SIZ marker segment (refer to FIG. 8) are rewritten to values that are $\frac{1}{2}^n$ of the original values. In addition, the number of decompositions described in the SPcod of the COD marker segment (refer to FIG. 9) is rewritten to a value that is reduced by n. Further, the entry of the last n bytes of the precinct size of the SPcod is deleted (this rewriting is unnecessary in the case of the maximum precinct having the precinct size=the subband size). The value of Lqcd of the QCD marker segment (refer to FIG. 11) is rewritten to a value reduced by 3 n (however, this rewriting is unnecessary in the case of coded data subjected to derived quantization, and in the case of coded data subjected to expounded quantization, the value is rewritten to a value reduced by 6 n). The entry of the last 3 n bytes of the SPqcd of the QCD marker segment is deleted (however, deleting is unnecessary in the case of coded data subjected to derived quantization, and in the case of coded data subjected to expounded quantization, the entry of 6 n bytes is deleted). When the COC marker segment exists (refer to FIG. 10), the Lcoc and the SPcoc thereof are also rewritten similarly to the Lcod and SPcod. When the QCC marker segment exists (refer to FIG. 12), the Lqcc and the SPqcc thereof are also rewritten similarly to the Lqcd and the SPqcd.

In the post-quantization process that decreases the number of components of coded data of the CPRL progression by n, packets of unnecessary components are discarded. In addition, the value of Lsiz of the SIZ marker segment (refer to FIG. 8) is rewritten to a value obtained by subtracting 3 n from the original value, and the value of the Csiz of the SIZ marker segment is rewritten to a value obtained by subtracting n from the original value. The entries of the last n components of the Ssiz, the XRsiz, and the YRsiz of the SIZ marker segment are deleted. If the byte of color conversion of the SGcod of the COD marker segment is "1," the byte is rewritten to "0." In JPEG 2000, the first three components are subjected to color conversion. Thus, when the first three components of four components are left (remain), for example, the byte of color conversion of the SGcod may remain "1."

In the post-quantization process that reduces the number of tiles of coded data of an arbitrary progression by n, packets of unnecessary n tiles are discarded. Also, the values of the Xsiz and the Ysiz of the SIZ marker segment are rewritten to values corresponding to the image size that is reduced by the decrease in the number of tiles. Additionally, in a case where it is necessary to change allocation of numbers of the remaining tiles, the Isot of the SOT marker segment (refer to FIG. 7) is rewritten.

As mentioned above, at the preview operation, instead of performing the loop control of the decoder 109 by the preview control unit 111, it is also possible to cause the decoder 109 to perform similar partial decoding and decompression by rewriting the header information of coded data. The present invention also includes such embodiment. A brief description will be given of this embodiment.

In a case where the number of layers of coded data of the LRCP progression is decreased by n, and partial decoding and decompression are performed while eliminating the bottom n layers, as explained in relation to post-quantization processing, the number of layers of the SGcod of the COD marker segment is rewritten to a value obtained by subtracting n from the original value. When the coded data after the rewriting are input to the decoder 109, without performing special loop control, an image the same as that obtained when post-quantization processing that discards the bottom n layers is performed is reproduced.

Partial decoding and decompression with a reduced number of tiles of coded data of an arbitrary progression order can be performed by rewriting of the header information similar to that in the case of post-quantization processing. When performing partial decoding and decompression, with a reduced number of tiles as shown in FIG. 23B, on coded data that are divided into 5 tiles×5 tiles as shown in FIG. 23A, for example, the 20 tiles to be decoded and decompressed are renumbered from 0 in the raster order. The five tiles not to be decoded and decompressed are renumbered to No. 20-No. 24. The Isot of the SOT marker is rewritten to the renumbered tile numbers. Further, the Xsiz and the Ysiz of the SIZ marker segment are rewritten to the image size formed by the 20 tiles to be decoded and decompressed.

When decreasing the number of resolution levels of coded data of the RLCP or RPCL progression, and when decreasing the number of components of coded data of the CPRL progression, rewriting of header information similar to that in the case of post-quantization processing is performed. Thereby, an image the same as that obtained in the case where post-quantization processing is performed is reproduced.

The preview method according to such rewriting of header information, however, has limitations compared to the method of performing loop control in the decoder 109. In other words, in the decoder 109, since packets are interpreted by the nested loops corresponding to the progression orders as mentioned above, it is limited to decoding and decompression of the factor relating to the outermost loop that can be controlled by rewriting of header information. That is, only decoding and decompression of reducing the number of layers is allowed for coded data of the LRCP progression, only decoding and decompression of reducing the number of resolution levels is allowed for coded data of the RLCP or RPCL progression, and only decoding and decompression of reducing the number of components is allowed for coded data of the CPRL progression. If rewriting is performed on header information relating to the other factors, there is a high probability that an error may occur in decoding and decompression depending on the configuration of the decoder 109. However, decoding and decompression with a reduced number of tiles can be performed irrespective of the progression order.

A description will now be given of an operation mode B in which post-quantization processing is successively performed under predetermined conditions on a newly photographed image or a recorded image.

FIG. 24 is a flow chart for illustrating the operation mode B. In step S200, the system controller 106 reads the post-quantization conditions (control parameters) saved in the condition saving area of the memory 105, supplies the contents of the conditions to the image processor 103, and causes the image processor 103 to display the contents of the conditions on the display unit 104. In step S205, the user can select one of the post-quantization conditions displayed on the display unit 104 by operating the operations unit 107. The system controller 106 writes the post-quantization condition (control parameter) selected by the user to the control parameter temporary storing area of the memory 105.

Then, in step S206, the user indicates whether the process target is a newly photographed image or a recorded image. When the process target is a recorded image (YES in step S206), in step S207, the thumbnails of the images that are recorded on the recording medium 113 are displayed on the display unit 104, and the user can select (specify) one or more of the images (still images or moving images) that the user wishes to process.

When processing of the recorded image is specified, in step S210, coded data of one image (an image obtained by still image photographing or a frame image of a moving image) selected by the user are read from the recording medium 113 and supplied to the memory 105 according to the control by the system controller 106. In step 215, the coded data are subjected to post-quantization processing by the post-quantization process unit 110 in accordance with the post-quantization conditions that are written to the control parameter temporary storing area of the memory 105. In step S220, the coded data after the post-quantization processing are overwritten (recorded) onto the original coded data of the recording medium 113 by the media recorder 112. In step S225, it is determined whether post-quantization processing with respect to all images selected by the user is completed. When one or more images (still images or selected frame images of a moving image) selected by the user are left (remaining) (NO in step S225), steps S210, S215, and S220 are repeated with respect to each of the remaining images. When post-quantization processing with respect to all images (all frame images of the moving image) selected by the user are completed (YES in step S225), the operation of the operation mode B ends. Such successive post-quantization processing of recorded images is convenient for increasing a free area (available for recording) of the recording medium 113, for example.

In a case where processing of a newly photographed image is specified (NO in step S206), in step S210, image data photographed by a still image photographing operation or a moving image photographing operation are compressed by the encoder 108 in a lossless manner (or at a low compression rate close to lossless), and the coded data are written to the memory 105. In step S215, the coded data are subjected to post-quantization processing by the post-quantization process unit 110 in accordance with the set post-quantization conditions. In step S220, the coded data after post-quantization processing are recorded on the recording medium 113 as an image file by the media recorder 112. Steps S210, S215, and S220 are performed repeatedly with respect to coded data of each photographed image (each frame). When an end instruction is input by the user (YES in step S225), the operation of the operation mode B ends.

Above, the present invention is explained in relation to the electronic camera device 10 such as a digital camera and a digital video camera. However, it is obvious that the present invention may be applied not only to electronic camera devices but also to general image processing apparatuses that handle coding of images. In addition, the procedures, i.e., the processing methods, illustrated with reference to FIGS. 21 and 24 may be carried out by programs on a computer. The present invention also includes various recording (storage) media recording the programs thereon.

Embodiment 2

Figure 25:
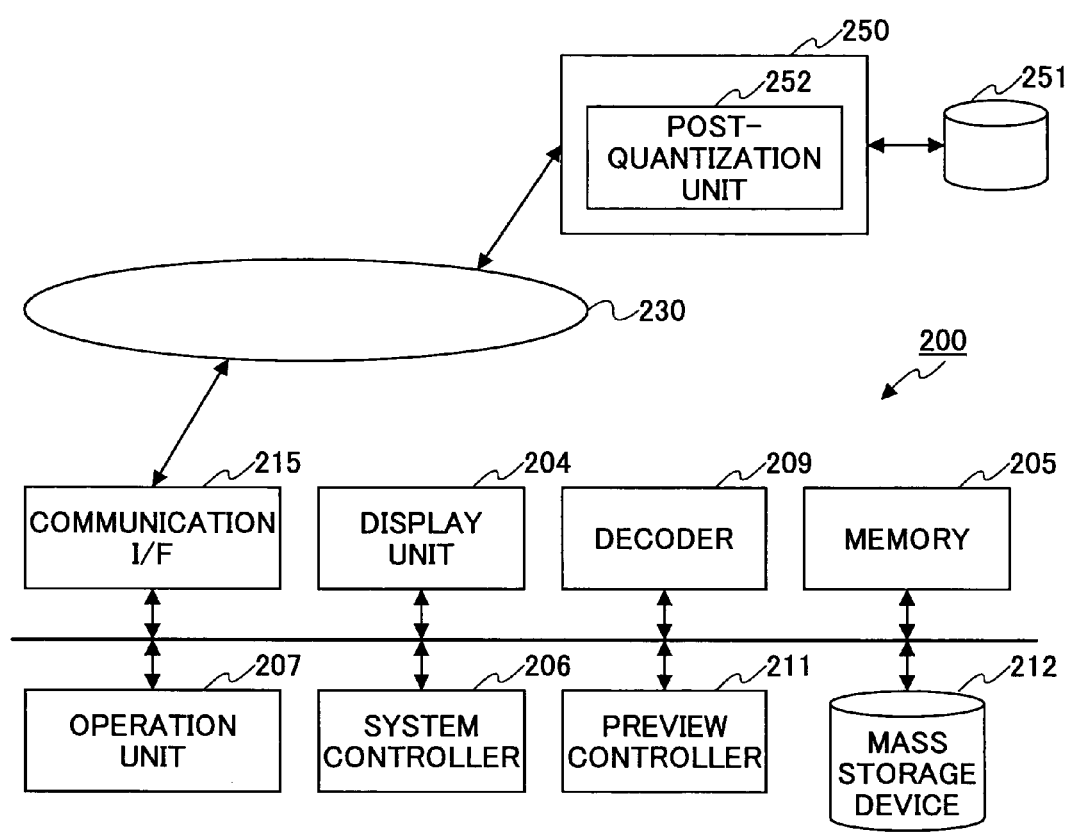
FIG. 25 is a block diagram for illustrating an embodiment of the present invention.

FIG. 25 is a block diagram for illustrating Embodiment 2 of the present invention.

An image processing apparatus 200 according to Embodiment 2 includes a communication interface (I/F) 215 with respect to a network (a LAN, the Internet, for example) 230 and has a function of downloading coded data of images from a server 250 on the network 230. In addition, the image processing apparatus 200 includes a system controller 206 for controlling the image processing apparatus 200, an operations unit 207 for user input, a display unit 204 for displaying images and the like, a decoder 209 that conforms to JPEG 2000 and is for decoding and decompression of coded data of images, a preview controller 211 similar to the preview controller 111 in FIG. 20, a mass storage device 212 such as a hard disk for storing images and programs, and a memory 205 for temporarily storing data and programs such as coded data of images.

Specifically, the image processing apparatus 200 is a computer such as a personal computer. The system controller 206, the preview controller 211, the decoder 209 and the like are realized by a program by using the hardware resources of the computer. In this case, the operations unit 207 is a keyboard and a mouse, which are generally used as user input devices of computers.

The server 250 has functions similar to those of a WWW server on the Internet. The server 250 stores in a mass storage device 251 a large quantity of coded data of images subjected to compression coding in a lossless manner (or at a low compression rate close to lossless). The server 250 is provided with a post-quantization unit 252 as a post-quantization processing mechanism for carrying out a post-quantization process of coded data.

FIG. 26 is a simplified flow chart for illustrating the operation of the image processing apparatus 200. The operation flow shown in the flow chart in FIG. 26 is controlled by the system controller 206.

Step S300: The image processing apparatus 200 downloads from the server 250 coded data of a still image (or a frame image of a moving image) for post-quantization condition setting by the preview operation. The procedure of the downloading may be similar to that of the downloading of images from a WWW server by using a commonly-used browser.

Step S305: The downloaded coded data of the image are temporarily stored in the memory 205, and are also decoded and decompressed by the decoder 209. The reproduced image data (an image of the reproduced image) are displayed on the display unit 204.

Step S310: Setting of the post-quantization conditions by the preview operation similar to that illustrated in relation to step S125 of FIG. 21 is performed. On this occasion, the preview controller 211 performs loop control of the decoder 209, which is similar to that performed by the preview controller 111 shown in FIG. 20. Alternatively, the preview controller 211 rewrites header information of the coded data. It is also possible to set one of the post-quantization conditions that are recorded in advance.

Step S315: When the post-quantization conditions are set, the conditions are reported to the server 250 on the network 230 via the communication interface 215. The post-quantization conditions are set to the post-quantization unit 252 in the server 250.

S320: The image processing apparatus 200 issues a download request for a required image to the server 250. In the server 250, post-quantization processing of the coded data of the image is performed by the post-quantization unit 252 in accordance with the set post-quantization conditions, and the coded data after the post-quantization processing are transmitted to the image processing apparatus 200. In the image processing apparatus 200, the coded data of the downloaded image are stored in the memory 205 or the mass storage device 212.

With the above-mentioned procedure, the user of the image processing apparatus 200 can capture the coded data of the image subjected to post-quantization processing under the desired post-quantization conditions, decode and decompress the coded data by the decoder 209 if necessary, and display the image on the display unit 204.

The present invention includes the server 250 configured as mentioned above. In addition, the present invention includes the programs for carrying out the procedure illustrated with reference to FIG. 26 and for carrying out the processing method according to the present invention. Further, the present invention includes various recording (storage) media recording such programs thereon.

The description is given above on the assumption that coded data in the JPEG 2000 format are processed. However, it is obvious that the present invention may also be applied to image forming apparatuses having coded data subjected to compression coding by algorithms other than JPEG 2000 as processing targets, as long as the coded data are in such a format that allows similar partial decoding and decompression and post-quantization processing.

As mentioned above, with the image processing apparatus and the image processing method according to an embodiment of the present invention, the following effects can be achieved.

(1) By partially decoding and decompressing coded data in accordance with the post-quantization conditions that are set by the user, an image the same as the image after post-quantization processing to be performed in accordance with the post-quantization conditions is displayed. Since post-quantization that discards codes is not actually performed, it is possible to vary the post-quantization conditions any number of times. Accordingly, it is possible for the user to easily set the most appropriate post-quantization conditions while confirming in advance the results of post-quantization processing in accordance with various post-quantization conditions. Moreover, by performing post-quantization processing of coded data under the set post-quantization conditions, it is possible to adjust the compression rate without causing generation image degradation.

(2) Provided that coded data before post-quantization processing are lossless coded data or coded data of a compression rate close to lossless, it is possible for the user to arbitrarily adjust the compression rate from a very low compression rate to a high compression rate. In addition, since post-quantization processing does not cause generation image degradation, it is possible to perform setting of post-quantization conditions, in other words, setting of the compression rate in a digital camera, for example, at an arbitrary point before and after photographing of images.

(3) Original image data are not handled in post-quantization processing and partial decoding and decompression of coded data for setting post-quantization conditions. Hence, a working memory having a large capacity is not required.

(4) When setting post-quantization conditions, by calling the saved post-quantization conditions, it is possible for the user to effectively set post-quantization conditions.

(5) Since the compression rate is displayed when setting post-quantization conditions, it is possible for the user to easily confirm the relationship between the compression rate and the degree of image degradation.

(6) When setting post-quantization conditions, it is possible for the user to easily and positively confirm image degradation under the set post-quantization conditions by enlargement/reduction/scrolling of a displayed image.

(7) The display magnification is displayed when setting post-quantization conditions. Hence, it is possible for the user to easily confirm up to what display magnification image degradation is not conspicuous under the set post-quantization conditions.

(8) Post-quantization conditions can be saved by averaging. Thus, by setting and saving post-quantization conditions with respect to several images, it is possible for the user to save post-quantization conditions having less influence caused by differences among images.

(9) It is possible to set post-quantization conditions from various perspectives, such as the resolution, position, component, image quality (layer), and compression rate of an image.

(10) It is possible to perform post-quantization processing of coded data under post-quantization conditions that are selected from among the saved post-quantization conditions. Accordingly, it is possible to quickly perform, for example, post-quantization processing of coded data of a large number of images that are newly photographed and post-quantization processing of coded data of recorded images for securing a free (unused) area of a recording medium, without performing setting of post-quantization conditions in each case.

(11) By transmitting to a server on a network post-quantization conditions that the user desires, it is possible to capture from the server coded data already subjected to post-quantization processing under the conditions that the user desires.

The present invention is not limited to the specifically disclosed embodiments, and variations and modifications may be made without departing from the scope of the present invention.

The present application is based on Japanese priority application No. 2002-326368 filed on Nov. 11, 2002, the entire contents of which are hereby incorporated by reference.

What is claimed is:

1. An image processing apparatus, comprising:
a condition setting unit to arbitrarily set a post-quantization condition;
a partial decoding and decompression unit to partially decode and decompress coded data in accordance with the post-quantization condition set by the condition setting unit, to reproduce a first image that is substantially identical to a second image, the second image that will be reproduced by decoding and decompressing the coded data after the coded data has been subjected to a post-quantization processing in accordance with the post-quantization condition, wherein the post-quantization condition is related to at least one of position and component of an image; and
an image data displaying unit to display the first image reproduced by the partial decoding and decompression unit.

2. The image processing apparatus as claimed in claim 1, wherein the partial decoding and decompression unit comprises:
a decoder to conform to a compression coding algorithm applied to the coded data; and a controller to control a decoding and decompression operation of the decoder in accordance with the post-quantization condition set by a user using the condition setting unit.

3. The image processing apparatus as claimed in claim 1, wherein the partial decoding and decompression unit comprises:
a decoder to conform to a compression coding algorithm applied to the coded data; and
a rewriting unit to rewrite header information of the coded data in accordance with the post-quantization condition set by a user using the condition setting unit.

4. The image processing apparatus as claimed in claim 1, wherein the partial decoding and decompression unit comprises:
a decoder to conform to a compression coding algorithm applied to the coded data; and
a writing unit to write header information of the coded data in accordance with the post-quantization condition set by a user using the condition setting unit.

5. The image processing apparatus as claimed in claim 1, further comprising:
a post-quantization unit to perform post-quantization processing of the coded data according to an instruction by the user and in accordance with the post-quantization condition set by a user using the condition setting unit.

6. The image processing apparatus as claimed in claim 1, further comprising:
a condition saving unit to save a plurality of post-quantization conditions set by a user using the condition setting unit,
wherein one of the post-quantization conditions saved in the condition saving unit can be set as a post-quantization condition by the condition setting unit.

7. The image processing apparatus as claimed in claim 1, further comprising:
a condition saving unit to save a plurality of post-quantization conditions set by a user using the condition setting unit;
a condition selector by which the user selects one of the post-quantization conditions saved in the condition saving unit; and
a post-quantization unit to perform post-quantization processing of coded data in accordance with the post-quantization condition selected by the user using the condition selector.

8. The image processing apparatus as claimed in claim 6, further comprising:
an averaging unit to average the post-quantization conditions saved in the condition saving unit and the post-quantization condition set by the user using the condition setting unit,
wherein an averaged post-quantization condition obtained by the averaging unit is saved in the condition saving unit.

9. The image processing apparatus as claimed in claim 7, further comprising:
an averaging unit to average the post-quantization conditions saved in the condition saving unit and the post-quantization condition set by the user using the condition setting unit,
wherein an averaged post-quantization condition obtained by the averaging unit is saved in the condition saving unit.

10. The image processing apparatus as claimed in claim 1, wherein a compression rate at the time of the post-quantization processing performed in accordance with the post-quantization condition set by a user using the condition setting unit is displayed on the display unit.

11. The image processing apparatus as claimed in claim 1, further comprising:
an image modifying unit to enlarge, reduce, or scroll an image displayed on a display unit in accordance with an instruction of the user.

12. The image processing apparatus as claimed in claim 11, wherein a magnification of the image is displayed on the display unit.

13. The image processing apparatus as claimed in claim 1, further comprising:
an imaging unit to photograph one of a still image and a moving image; and
an encoder to generate coded data allowing post-quantization processing by performing compression coding on image data of the image photographed by the imaging unit.

14. The image processing apparatus as claimed in claim 1, further comprising:
a communication unit to receive coded data from an external apparatus and transmit to the external apparatus the post-quantization condition set by a user using the condition setting unit.

15. The image processing apparatus as claimed in claim 1, wherein the post-quantization condition is further related to at least one of resolution, image quality, and compression rate of an image.

16. The image processing apparatus as claimed in claim 1, wherein the coded data are JPEG 2000 coded data.

17. An image processing method, comprising:
arbitrarily setting a post-quantization condition;
partially decoding and decompressing coded data in accordance with the post-quantization condition set, to reproduce a first image substantially identical to a second image, the second image that will be reproduced by decoding and decompressing the coded data after the coded data has been subjected to a post-quantization processing in accordance with the post-quantization condition, wherein the post-quantization condition is related to at least one of position and component of an image; and
displaying the first image reproduced by partially decoding and decompressing coded data.

18. The image processing method as claimed in claim 17, wherein partially decoding and decompressing the coded data comprises controlling a decoding and decompression operation of a decoder that conforms to a compression coding algorithm applied to the coded data in accordance with the post-quantization condition set in setting the post-quantization condition.

19. The image processing method as claimed in claim 17, wherein partially decoding and decompressing the coded data comprises causing a decoder that conforms to a compression coding algorithm applied to the coded data to decode and decompress the coded data whose header information is rewritten in accordance with the post-quantization condition set in setting the post-quantization condition.

20. The image processing method as claimed in claim 17, wherein partially decoding and decompressing the coded data comprises causing a decoder that conforms to a compression coding algorithm applied to the coded data to decode and decompress the coded data whose header information is written in accordance with the post-quantization condition set in setting the post-quantization condition.

21. The image processing method as claimed in claim 17, further comprising:

performing post-quantization processing of coded data according to an instruction by a user and in accordance with the post-quantization condition set in setting the post-quantization condition.

22. The image processing method as claimed in claim 17, further comprising:

saving one or more post-quantization conditions set in setting the post-quantization condition;

selecting, by a user, one of the post-quantization conditions saved in saving the post-quantization conditions; and performing post-quantization processing of the coded data in accordance with the post-quantization condition selected in selecting the post-quantization condition.

23. The image processing method as claimed in claim 17, further comprising:

receiving the coded data from an apparatus; and transmitting to the apparatus the post-quantization condition set in setting the post-quantization condition.

24. A computer-readable storage medium storing thereon instructions which, when executed by a computer, cause the computer to carry out an imaging process by:

causing the computer to prompt a user to arbitrarily set a post-quantization condition;

causing the computer to partially decode and decompress coded data in accordance with the post-quantization condition set by the user, to cause the computer to reproduce a first image substantially identical to a second image which will be reproduced by decoding and decompressing the coded data after the coded data has been subjected to a post-quantization processing in accordance with the post-quantization condition, wherein the post-quantization condition is related to at least one of position and component of an image; and causing the computer to display the first image reproduced in response to the instruction of causing the computer to partially decode and decompress the coded data.

25. The computer-readable storage medium as claimed in claim 24, wherein causing the computer to partially decode and decompress the coded data comprises controlling a decoding and decompression operation of a decoder that conforms to a compression coding algorithm applied to the coded data in accordance with the post-quantization condition set by the user.

26. The computer-readable storage medium as claimed in claim 24, wherein causing the computer to partially decode and decompress the coded data comprises causing a decoder that conforms to a compression coding algorithm applied to the coded data to decode and decompress the coded data whose header information is rewritten in accordance with the post-quantization condition set by the user.

27. The computer-readable storage medium as claimed in claim 24, wherein causing the computer to partially decode and decompress the coded data comprises causing a decoder that conforms to a compression coding algorithm applied to the coded data to decode and decompress the coded data whose header information is written in accordance with the post-quantization condition set by the user.

28. The computer-readable storage medium as claimed in claim 24, wherein the image process further comprises:

causing the computer to perform post-quantization processing of coded data according to an instruction by the user and in accordance with the post-quantization condition set by the user.

29. The computer-readable storage medium as claimed in claim 24, wherein the image process further comprises:

causing the computer to save one or more post-quantization conditions set by the user;

causing the computer to prompt the user to select one of the post-quantization conditions saved in the instruction of causing the computer to save the post-quantization conditions; and causing the computer to perform post-quantization processing of the coded data in accordance with the post-quantization condition selected by the user.

30. The computer-readable storage medium as claimed in claim 24, wherein the image process further comprises:

causing the computer to receive the coded data from an apparatus; and causing the computer to transmit to the apparatus the post-quantization condition set by the user.

* * * * *